US011314254B2

(12) United States Patent
Macias et al.

(10) Patent No.: US 11,314,254 B2
(45) Date of Patent: Apr. 26, 2022

(54) METHODS AND APPARATUS FOR DYNAMICALLY ROUTING ROBOTS BASED ON EXPLORATORY ON-BOARD MAPPING

(71) Applicant: Intel Corporation, Santa Clara, CA (US)

(72) Inventors: Leobardo Campos Macias, Guadalajara (MX); Rodrigo Aldana Lopez, Zapopan (MX); Rafael de la Guardia Gonzalez, Guadalajara (MX); David Gomez Gutierrez, Tlaquepaque (MX); Jose Parra Vilchis, Guadalajara (MX)

(73) Assignee: INTEL CORPORATION, Santa Clara, CA (US)

( * ) Notice: Subject to any disclaimer, the term of this patent is extended or adjusted under 35 U.S.C. 154(b) by 479 days.

(21) Appl. No.: 16/365,197

(22) Filed: Mar. 26, 2019

(65) Prior Publication Data
US 2019/0220020 A1    Jul. 18, 2019

(51) Int. Cl.
*G01C 21/20* (2006.01)
*G05D 1/02* (2020.01)
(Continued)

(52) U.S. Cl.
CPC ......... *G05D 1/0202* (2013.01); *B64C 39/024* (2013.01); *B64D 47/08* (2013.01);
(Continued)

(58) Field of Classification Search
USPC .... 700/245–264; 701/400–533, 3–11, 23–28
See application file for complete search history.

(56) References Cited

U.S. PATENT DOCUMENTS 8,355,818 B2 *   1/2013   Nielsen ............... G05D 1/0214
                                                               700/258
9,427,867 B2 *   8/2016   Trautman ............ G05D 1/0253
(Continued)

OTHER PUBLICATIONS

Heiden et al., "Planning High-speed Safe Trajectories in Confidence-rich Maps," Department of Computer Science, University of Southern California, 7 pages.
(Continued)

*Primary Examiner* — Jonathan L Sample
(74) *Attorney, Agent, or Firm* — Hanley, Flight & Zimmerman, LLC

(57) ABSTRACT

Methods and apparatus for dynamically routing robots based on exploratory on-board mapping are disclosed. A control system of a robot includes an image manager to command a depth camera to capture depth images of an environment. The depth camera has a field of view. The control system further includes a map generator to generate a map of the environment based on the depth images. The map includes a representation of unoccupied space within the environment, and a path extending through the unoccupied space from a reference location of the robot to a target location of the robot. The control system further includes a field of view evaluator to determine whether the field of view associated with the reference location satisfies a threshold. The control system further includes a route generator to generate, in response to the field of view associated with the reference location satisfying the threshold, a route to be followed by the robot within the environment. The route includes a first candidate location located along the path of the map between the reference location and the target location. The first candidate location is within the field of view associated with the reference location.

24 Claims, 17 Drawing Sheets

(51) Int. Cl.
  *B64C 39/02*   (2006.01)
  *B64D 47/08*   (2006.01)
  *G06K 9/00*    (2022.01)
  *H04N 5/232*   (2006.01)
  *H04N 13/00*   (2018.01)
  *H04N 13/111*  (2018.01)

(52) U.S. Cl.
  CPC ......... *G01C 21/206* (2013.01); *G05D 1/0251* (2013.01); *G05D 1/0274* (2013.01); *G06K 9/00671* (2013.01); *H04N 5/23229* (2013.01); *B64C 2201/141* (2013.01); *H04N 13/111* (2018.05); *H04N 2013/0081* (2013.01)

(56) References Cited

U.S. PATENT DOCUMENTS

| | | | |
|---|---|---|---|
| 9,625,909 B2* | 4/2017 | Hu | G05D 1/0011 |
| 10,269,257 B1* | 4/2019 | Gohl | G06K 9/52 |
| 10,416,668 B2* | 9/2019 | Hammond | G06F 3/0484 |
| 10,571,926 B1* | 2/2020 | Zhang | G05D 1/0219 |
| 11,016,491 B1* | 5/2021 | Millard | G05D 1/0214 |
| 11,048,277 B1* | 6/2021 | Zhu | G06T 7/20 |
| 2008/0027591 A1* | 1/2008 | Lenser | G05D 1/0251 |
| | | | 701/2 |
| 2012/0239191 A1* | 9/2012 | Versteeg | G06N 3/004 |
| | | | 700/246 |
| 2016/0188977 A1* | 6/2016 | Kearns | G05D 1/0274 |
| | | | 348/113 |
| 2016/0231746 A1* | 8/2016 | Hazelton | G01S 13/867 |
| 2017/0161910 A1* | 6/2017 | Aghamohammadi | G06K 9/00664 |
| 2018/0286072 A1* | 10/2018 | Tsai | G01C 21/20 |
| 2019/0011921 A1* | 1/2019 | Wang | H04N 5/23299 |
| 2019/0113927 A1* | 4/2019 | England | G05D 1/0231 |
| 2019/0145778 A1* | 5/2019 | Huang | G01C 21/20 |
| | | | 701/3 |
| 2019/0196467 A1* | 6/2019 | Aldana Lopez | G08G 5/0039 |
| 2019/0205659 A1* | 7/2019 | Cuban | G06K 9/00778 |
| 2019/0220002 A1* | 7/2019 | Huang | G06K 9/6202 |
| 2019/0253611 A1* | 8/2019 | Wang | G06F 3/04845 |
| 2019/0377345 A1* | 12/2019 | Bachrach | G06T 7/20 |
| 2019/0378423 A1* | 12/2019 | Bachrach | H04L 67/18 |
| 2020/0003897 A1* | 1/2020 | Shroff | G01S 17/86 |
| 2020/0020093 A1* | 1/2020 | Frei | G08G 5/0034 |
| 2020/0027230 A1* | 1/2020 | Zhao | G06T 7/20 |
| 2020/0103523 A1* | 4/2020 | Liu | G01S 13/865 |

OTHER PUBLICATIONS

Hornung et al., "OctoMap: An Efficient Probabilistic 3D Mapping Framework Based on Octrees," Autonomous Robots, 2013, accepted Dec. 31, 2012, 17 pages.

Florence et al., "NanoMap: Fast, Uncertainty-Aware Proximity Queries with Lazy Search over Local 3D Data," Massachusetts Institute of Technology, Feb. 25, 2018, 8 pages.

Fragoso et al., "A Fast Motion Planning Representation for Configuration Flat Robots with Applications to Micro Air Vehicles," 2017 American Control Conference, May 24-26, 2017, 8 pages.

Cieslewski et al., "Rapid Exploration with Multi-Rotors: A Frontier Selection Method for High Speed Flight," 2017 IEEE/RSJ International Conference on Intelligent Robots and Systems (IROS), Sep. 24-28, 2017, 8 pages.

* cited by examiner

METHODS AND APPARATUS FOR DYNAMICALLY ROUTING ROBOTS BASED ON EXPLORATORY ON-BOARD MAPPING

FIELD OF THE DISCLOSURE

This disclosure relates generally to methods and apparatus for routing robots and, more specifically, to methods and apparatus for dynamically routing robots based on exploratory on-board mapping.

BACKGROUND

Autonomous robots (e.g., unmanned aerial vehicles (UAVs), unmanned ground vehicles (UGVs), etc.) experience situations where a simple, direct path between a reference (e.g., current) location of the robot and a target (e.g., destination) location of the robot cannot be followed. For example, an unmapped obstacle may block a direct path of the robot. As another example, the robot may be exploring an unknown (e.g., unmapped) environment. In such examples, the robot must navigate reactively based on information obtained from its sensors, exploiting promising directions in its field of view while at the same time storing alternative paths for backtracking if necessary. As the robot navigates, it must maintain a map that provides a sufficiently accurate but compact representation of the surrounding environment so that the robot can adapt its motion and/or route to avoid collisions without losing track of its target location.

Figure 1:
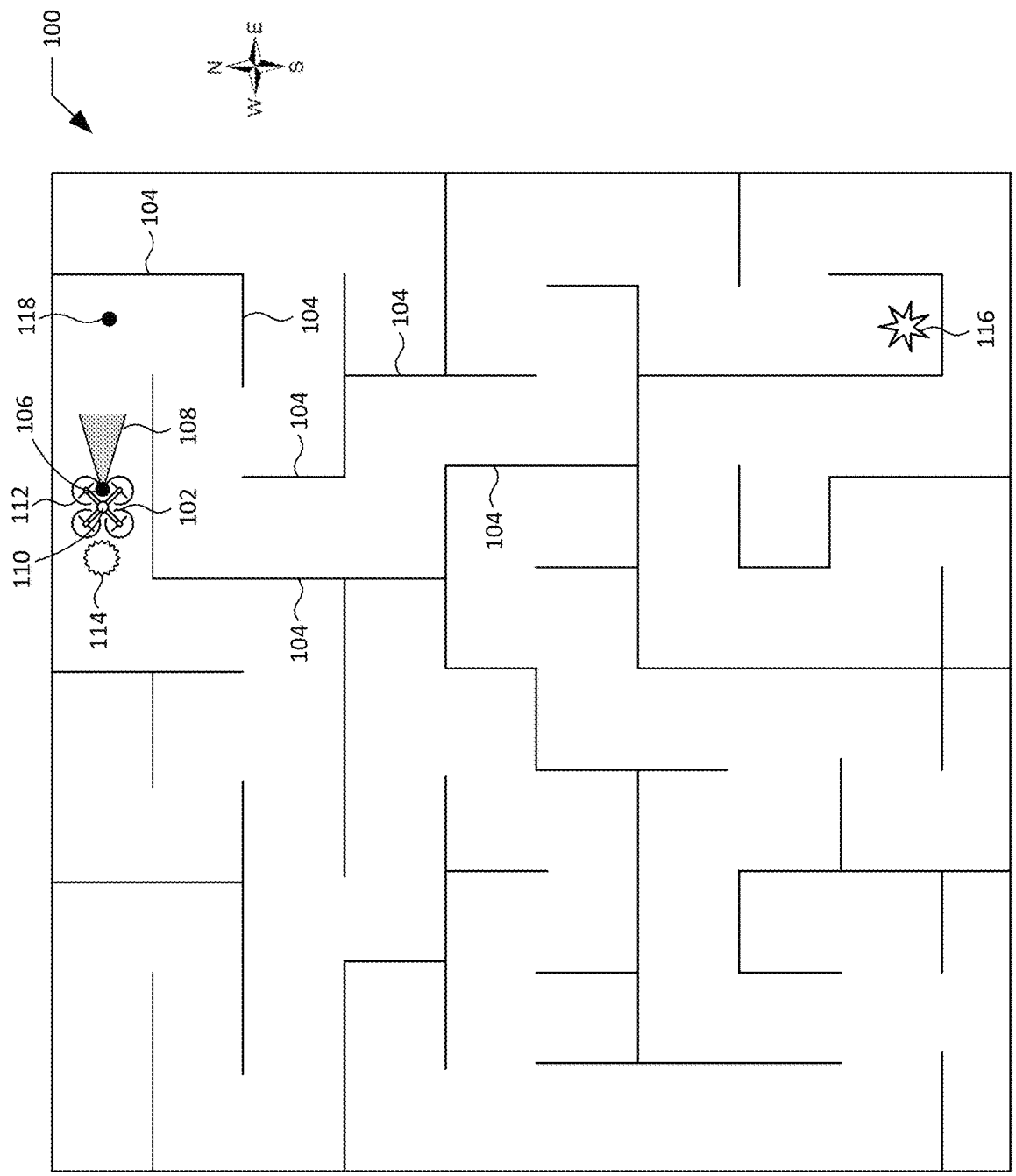
FIG. 1 illustrates an example environment in which an example robot may implement methods and apparatus in accordance with teachings of this disclosure to dynamically route the robot based on exploratory on-board mapping.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Autonomous robots (e.g., unmanned aerial vehicles (UAVs), unmanned ground vehicles (UGVs), etc.) experience situations where a simple, direct path between a reference (e.g., current) location of the robot and a target (e.g., destination) location of the robot cannot be followed. For example, an unmapped obstacle may block a direct path of the robot. As another example, the robot may be exploring an unknown (e.g., unmapped) environment. In such examples, the robot must navigate reactively based on information obtained from its sensors, exploiting promising directions in its field of view while at the same time storing alternative paths for backtracking if necessary. As the robot navigates, it must maintain a map that provides a sufficiently accurate but compact representation of the surrounding environment so that the robot can adapt its motion and/or route to avoid collisions without losing track of its target location.

Known solutions to the above-described environment exploration problem typically implement next-best-view or frontier based algorithms that lack integration of mapping and routing (e.g., trajectory) generation. For example, the known solutions either provide fast methods for local planning, or accurate maps for global planning, but not both. The known solutions lack efficient algorithms that enable the use of promising directions in the field of view of the robot and quick retrieval of alternative paths for backtracking, based on maps (e.g., generated on board the robot in real time or near real time) that provide a built-in topological description of the environment within which the robot is navigating. Furthermore, the known solutions are insufficient for many real-world applications as they merely enable a robot to reach a certain target location without taking into consideration any of the operational constraints of the robot including, for example, navigation efficiency associated with limited battery capacity, and/or navigation safety associated with uncertainty in the perception pipeline.

Unlike the known solutions described above, example methods and apparatus disclosed herein implement integrated mapping and routing operations that advantageously enable a robot to be dynamically routed within an environment based on exploratory on-board mapping. Disclosed methods and apparatus are especially advantageous for applications and/or uses that involve navigating a robot in a complex, unknown environment.

In some example disclosed methods and apparatus a map is generated of free (e.g., unoccupied) space based on disparity measurements associated with depth images captured by a depth camera of a robot as the robot navigates within an environment. In some examples, the generated map includes topological information that advantageously facilitates the implementation of graphical techniques for finding shortest paths to desired locations and/or unexplored regions within the environment.

In some disclosed examples a path is translated from the generated map into one or more candidate location(s) within the field of view of the robot into which the robot can freely move without the occurrence of a collision. In connection with navigating the robot toward and/or to a target location within the environment, disclosed methods and apparatus route the robot from its current location to a preferred one of the candidate location(s) (e.g., to the candidate location that is determined to be the closest to the target location) within the environment. Disclosed methods and apparatus may route the robot to the target location in response to the target location appearing within the field of view of the robot.

In some examples, disclosed methods and apparatus implement a dynamic filter to advantageously generate a dynamically-feasible route that maintains a given bounded error from the beginning to the end of the route. Routes generated via the dynamic filter are advantageously configured to succeed (e.g., to be free of collisions) in the presence of model disturbances and environmental uncertainty. By implementing the dynamic filter, disclosed methods and apparatus eliminate the need for solving complex optimization problems in connection with routing the robot, thereby advantageously reducing the processing requirements of the robot.

FIG. 1 illustrates an example environment 100 in which an example robot 102 may implement methods and apparatus in accordance with teachings of this disclosure to dynamically route the robot 102 based on exploratory on-board mapping. In the illustrated example of FIG. 1, the environment 100 is configured as a random arrangement of example walls 104. The arrangement of walls 104 of FIG. 1 is not meant as a restriction on the type, the shape, and/or the size of the environment 100 in which the robot 102 of FIG. 1 may be implemented. The environment 100 of FIG. 1 may be of any type (e.g., a man-made environment, a naturally-occurring environment, an indoor environment, an outdoor environment, etc.), any size, and/or any shape, depending on implementation details.

In the illustrated example of FIG. 1, the robot 102 is implemented as an autonomous multi-rotor UAV. In other examples, the robot 102 may alternatively be implemented as a different type of autonomous UAV (e.g., an autonomous single-rotor UAV, an autonomous fixed-wing UAV, etc.). In still other examples, the robot 102 may alternatively be implemented as an autonomous UGV. In still other examples, the robot 102 may alternatively be implemented as a semi-autonomous UAV, or as a semi-autonomous UGV.

In the illustrated example of FIG. 1, the robot 102 includes an example depth camera 106 (e.g., a forward-facing stereo camera) having an associated example field of view 108. The depth camera 106 captures depth images corresponding to portions of the environment 100 that are located within the field of view 108 of the depth camera 106. The robot 102 of FIG. 1 also includes an example odometry sensor 110 that senses, measures and/or detects data associated with a pose of the robot 102 relative to a reference pose. As used herein, the term "pose" refers to an orientation of an object and an associated location of the object. For example, a pose of the robot 102 is the orientation of the robot and an associated location of the robot. In the illustrated example of FIG. 1, the odometry sensor 110 senses, measures and/or detects pose data that enables the robot 102 to determine that the robot 102 is positioned in a first example pose 112 (e.g., an eastern-facing pose) within and/or relative to the environment 100. The pose data sensed, measured and/or detected by the odometry sensor 110 further enables the robot 102 to determine that the robot 102 is located at an example reference location 114 (e.g., a current and/or first location) within and/or relative to the environment 100. The field of view 108 of the depth camera 106 of FIG. 1 is oriented in a direction (e.g., an eastern-facing direction) that matches the first pose 112 of the robot 102 within and/or relative to the environment 100.

The robot 102 of FIG. 1 implements methods and apparatus to dynamically route the robot 102, based on exploratory on-board mapping, from the reference location 114 (e.g., a current location) within the environment 100 to an example target location 116 (e.g., a destination location) within the environment 100. In the illustrated example of FIG. 1, the target location 116 is known to the robot 102. The arrangement of the walls 104 and/or, more generally, the layout and/or configuration of the environment 100, however, is/are unknown to the robot 102. Based on disparity measurements associated with the depth images captured via the depth camera 106 and pose data detected by the odometry sensor 110, the robot 102 of FIG. 1 identifies one or more area(s) of free (e.g., unoccupied) space located within the portion of the environment 100 that fall(s) within the field of view 108 of the depth camera 106. The robot 102 generates a map (e.g., a free-space map) representing the identified area(s) of free space. The generated map includes topological information that facilitates the implementation of graphical techniques for finding shortest paths to desired locations (e.g., the target location 116) and/or unexplored regions within the environment 100.

The robot 102 of FIG. 1 translates a path from the generated map into one or more candidate location(s) within the field of view 108 of the depth camera 106 into which the robot 102 can freely move without the occurrence of a collision. For example, a map generated by the robot 102 may indicate that a free-space area is located in an eastern direction relative to the reference location 114 of the robot 102 based on the first pose 112 of the robot 102 shown in FIG. 1. In such an example, the robot 102 may translate a path from the generated map (e.g., a path extending from the reference location 114 to the free-space area) into one or more candidate location(s) including an example candidate location 118. The robot 102 of FIG. 1 determines a preferred one of the candidate locations based on the respective proximities of the candidate locations relative to the target location 116. For example, the robot 102 may determine that the candidate location 118 is a preferred candidate location. In response to determining the preferred candidate location, the robot 102 of FIG. 1 generates a route extending between the reference location 114 and the preferred candidate location (e.g., candidate location 118). In some examples, the robot 102 implements a dynamic filter to generate a dynamically-feasible route that maintains a given bounded error from the reference location 114 to the preferred candidate location, thereby reducing (e.g., eliminating) the possibility of the robot 102 colliding with one or more of the wall(s) 104 of the environment 100.

Figure 2:
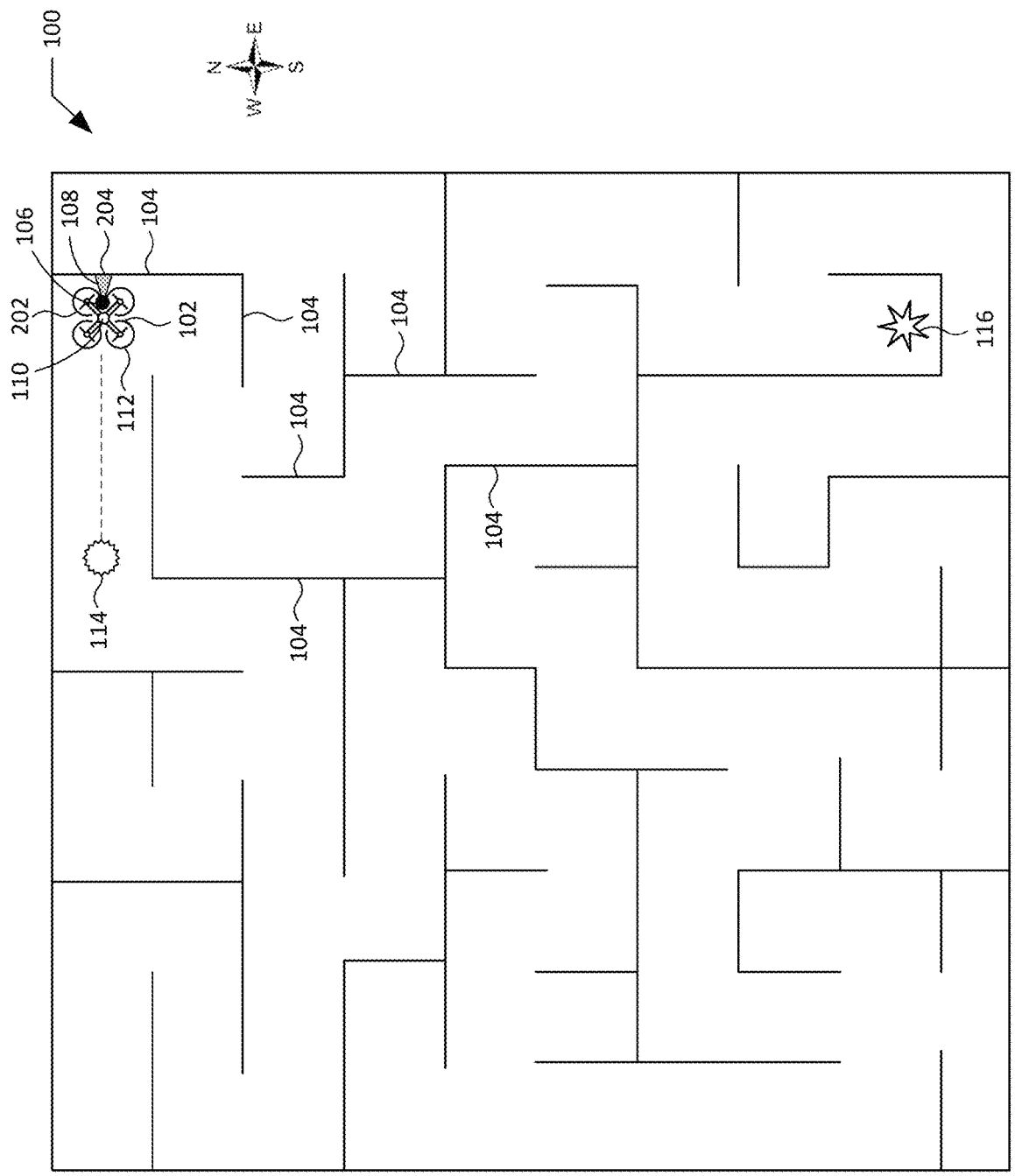
FIG. 2 illustrates the example robot of FIG. 1 located at a second example location within the example environment 100 of FIG. 1.

The robot 102 of FIG. 1 follows and/or tracks the generated route in connection with navigating toward the preferred candidate location (e.g., candidate location 118) and/or the target location 116. For example, FIG. 2 illustrates the robot 102 of FIG. 1 located at a second example location 202 within the environment 100 of FIG. 1. The second location 202 of FIG. 2 corresponds to the candidate location 118 of FIG. 1 described above. As the robot 102 approaches the second location 202 of FIG. 2 from the reference location 114, the field of view 108 of the depth camera 106 of the robot 102 is reduced in response to the increased proximity between the depth camera 106 of the robot 102 and a first example wall 204 from among the walls 104.

Figure 3:
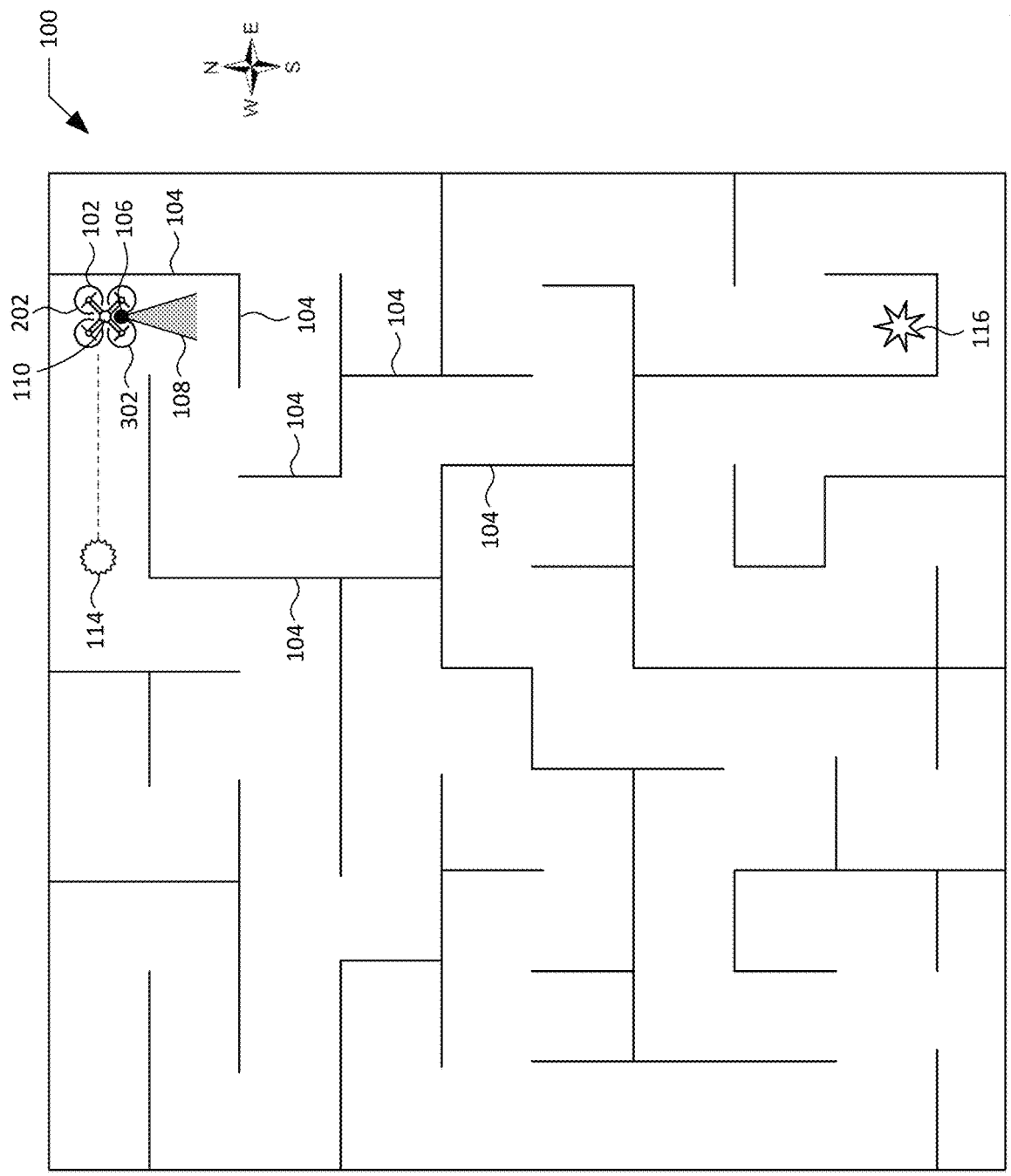
FIG. 3 illustrates the example robot of FIGS. 1 and 2 positioned in a second example pose within the example environment 100 of FIGS. 1 and 2.

In some examples, the robot 102 of FIGS. 1 and 2 modifies (e.g., rotates) the orientation and/or, more generally, the pose of the robot 102 within the environment 100 in response to the field of view 108 failing to satisfy a threshold (e.g., in response to the field of view 108 falling below a minimum threshold). For example, FIG. 3 illustrates the robot 102 of FIGS. 1 and 2 positioned in a second example pose 302 (e.g., a southern-facing pose) within the environment 100 of FIGS. 1 and 2. In response to the pose of the robot 102 being modified at the second location 202 from the first (e.g., eastern-facing) pose 112 shown in FIG. 2 to the second (e.g., southern-facing) pose 302 shown in FIG. 3, the robot 102 updates and/or regenerates the previously-generated map based on new and/or updated depth images of the environment 100 captured via the depth camera 106. In some examples, the robot 102 repeats and/or iterates the operations of identifying one or more free-space area(s), generating a map representing the identified free space area(s), translating a path from the generated map into one or more candidate location(s), determining a preferred candidate location, and routing the robot 102 to the preferred candidate location each time the pose of the robot 102 is modified.

Figure 4:
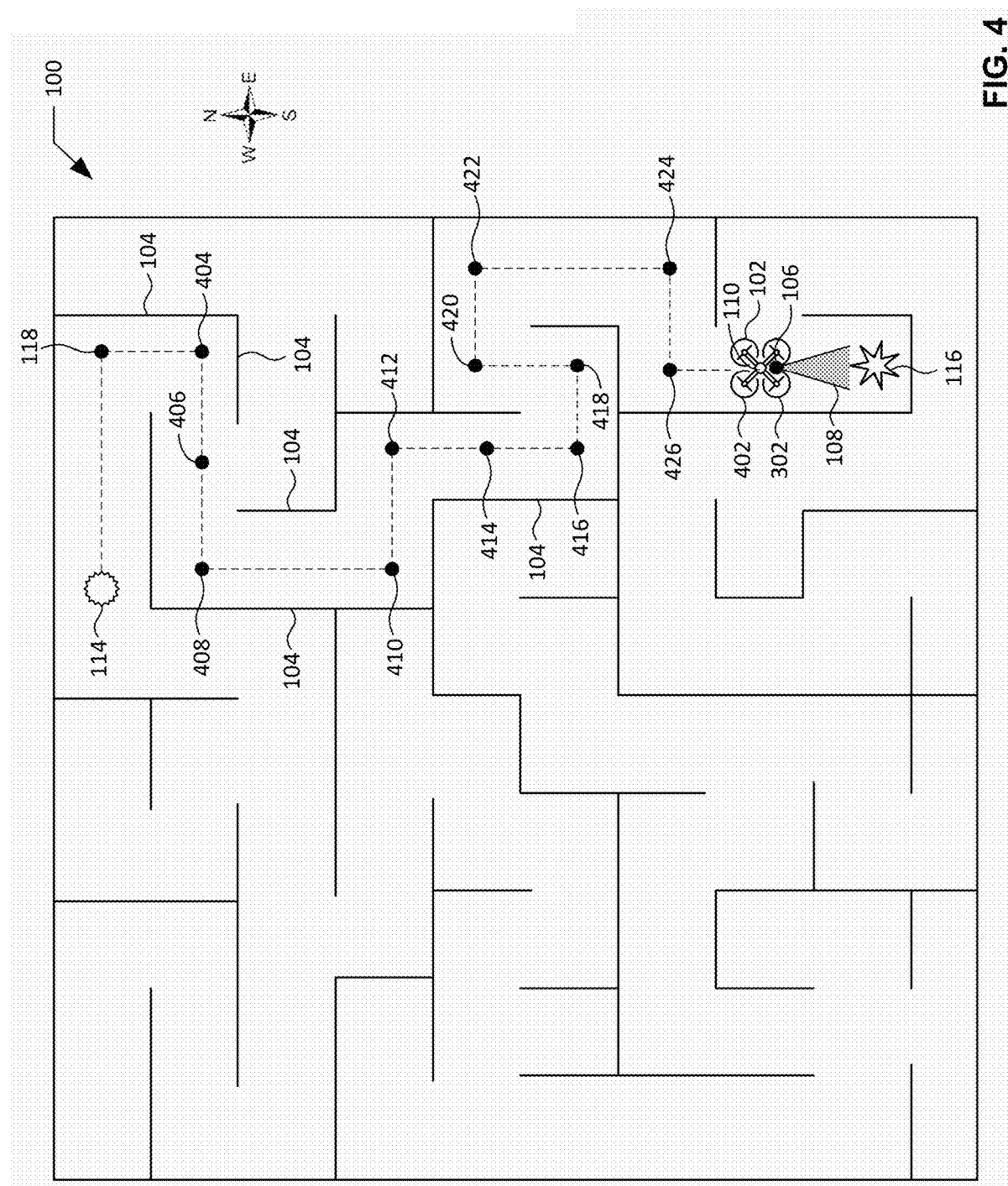
FIG. 4 illustrates the example robot of FIGS. 1-3 located at a third example location within the example environment 100 of FIGS. 1-3.

The robot 102 of FIGS. 1-3 additionally or alternatively repeats and/or iterates the operations of identifying one or more free-space area(s), generating a map representing the identified free space area(s), translating a path from the generated map into one or more candidate location(s), determining a preferred candidate location, and routing the robot 102 to the preferred candidate location in response to arriving at a preferred candidate location that does not include and/or correspond to the target location 116. The robot 102 accordingly navigates in a successive and/or sequential manner from one preferred candidate location to another preferred candidate location within the environment 100 until the target location 116 falls within the field of view 108 of the depth camera 106 of the robot 102. For example, FIG. 4 illustrates the robot 102 of FIGS. 1-3 located at a third example location 402 within the environment 100 of FIGS. 1-3. The target location 116 falls within the field of view 108 of the depth camera 106 of the robot 102 when the robot 102 is located at the third location 402 of FIG. 4.

In the illustrated example of FIG. 4, the robot 102 has been dynamically routed from the reference location 114 to the target location 116 based on exploratory on-board mapping. For examples, as shown in FIG. 4, the robot 102 has been dynamically routed from the reference location 114 to the first preferred candidate location 118, from the first preferred candidate location 118 to a second example preferred candidate location 404, from the second preferred candidate location 404 to a third example preferred candidate location 406, from the third preferred candidate location 406 to a fourth example preferred candidate location 408, from the fourth preferred candidate location 408 to a fifth example preferred candidate location 410, from the fifth preferred candidate location 410 to a sixth example preferred candidate location 412, from the sixth preferred candidate location 412 to a seventh example preferred candidate location 414, from the seventh preferred candidate location 414 to an eighth example preferred candidate location 416, from the eighth preferred candidate location 416 to a ninth example preferred candidate location 418, from the ninth preferred candidate location 418 to a tenth example preferred candidate location 420, from the tenth preferred candidate location 420 to an eleventh example preferred candidate location 422, from the eleventh preferred candidate location 422 to a twelfth example preferred candidate location 424, from the twelfth preferred candidate location 424 to a thirteenth example preferred candidate location 426, and from the thirteenth preferred candidate location 428 to the third location 402. The robot 102 iterates the operations of identifying one or more free-space area(s), generating a map representing the identified free space area(s), translating a path from the generated map into one or more candidate location(s), determining a preferred candidate location, and routing the robot 102 to the preferred candidate location in response to arriving at respective ones of the preferred candidate locations 118, 404, 406, 408, 410, 412, 414, 416, 418, 420, 422, 424, 426 of FIG. 4.

Figure 5:
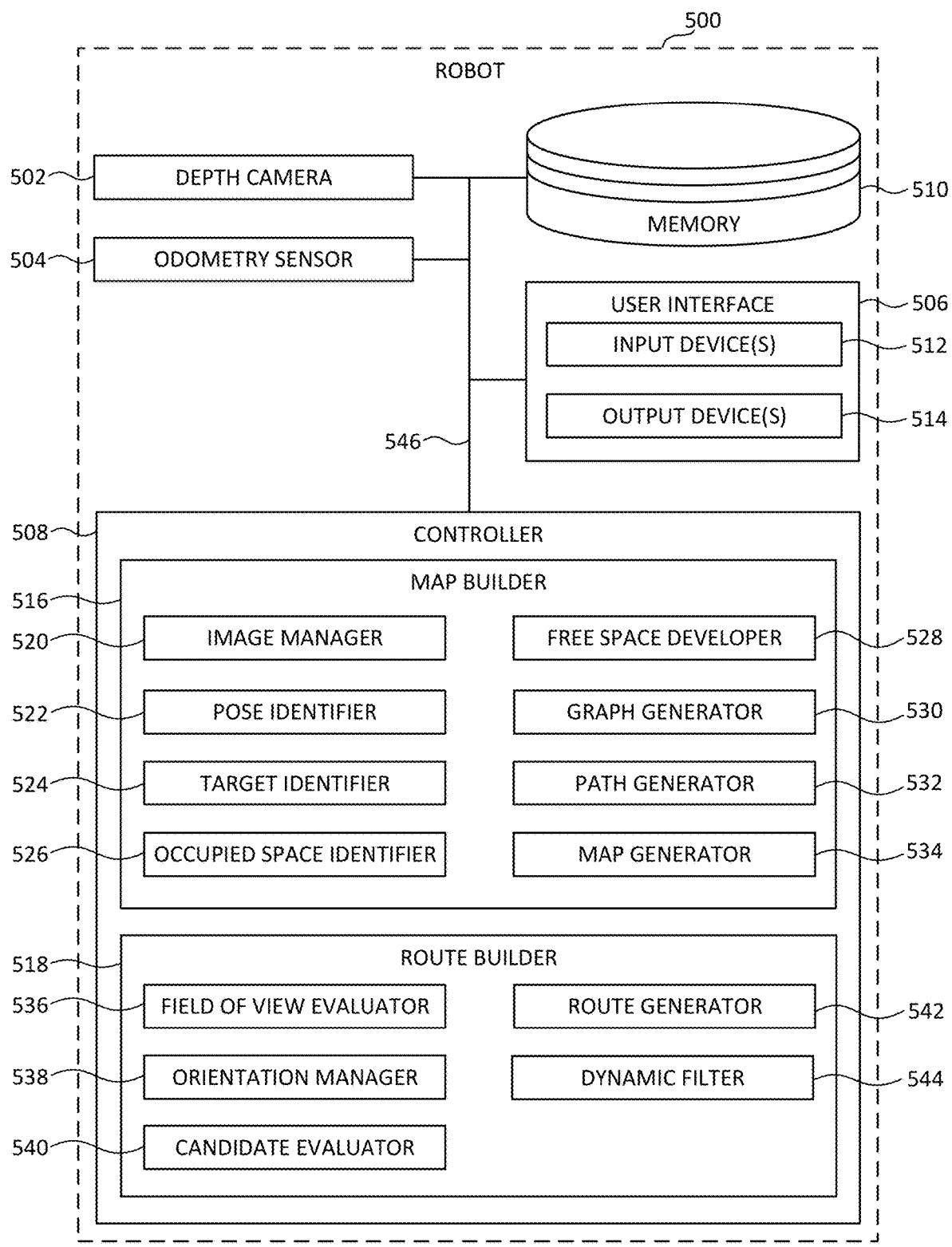
FIG. 5 is a block diagram of an example robot constructed in accordance with teachings of this disclosure.

FIG. 5 is a block diagram of an example robot 500 constructed in accordance with teachings of this disclosure. The block diagram of FIG. 5 may be used to implement the robot 102 of FIGS. 1-4. In the illustrated example of FIG. 5, the robot 500 includes an example depth camera 502, an example odometry sensor 504, an example user interface 506, an example controller 508, and an example memory 510. The example user interface 506 of FIG. 5 includes one or more example input device(s) 512 and one or more example output device(s) 514. The example controller 508 of FIG. 5 includes an example map builder 516 and an example route builder 518. The example map builder 516 of FIG. 5 includes an example image manager 520, an example pose identifier 522, an example target identifier 524, an example occupied space identifier 526, an example free space developer 528, an example graph generator 530, an example path generator 532, and an example map generator 534. The example route builder 518 of FIG. 5 includes an example field of view evaluator 536, an example orientation manager 538, an example candidate evaluator 540, an example route generator 542, and an example dynamic filter 544. However, other example implementations of the robot 500 may include fewer or additional structures.

In the illustrated example of FIG. 5, the depth camera 502, the odometry sensor 504, the user interface 506 (including the input device(s) 512 and the output device(s) 514), the controller 508 (including the map builder 516, the route builder 518, the image manager 520, the pose identifier 522, the target identifier 524, the occupied space identifier 526, the free space developer 528, the graph generator 530, the path generator 532, the map generator 534, the field of view evaluator 536, the orientation manager 538, the candidate evaluator 540, the route generator 542, and the dynamic filter 544), and/or the memory 510 are operatively coupled (e.g., in electrical communication) via an example communication bus 546.

The example depth camera 502 of FIG. 5 is mounted to the robot 500 of FIG. 5 and pointed in a forward-facing direction relative to a reference orientation of the robot 500. The depth camera 502 is configured and/or positioned to capture depth images of spaces and/or volumes that are generally located forward and/or ahead of the robot 500, and/or that are located within a field of view of the depth camera 502. In some examples, the depth camera 502 may be implemented as a stereo camera configured and/or positioned to capture depth images. In some examples, the depth images captured by the depth camera 502 of FIG. 5 may be RGB-depth (RGB-D) images. Depth image data captured by the depth camera 502 may be associated with one or more local time(s) (e.g., time stamped) at which the data was captured by the depth camera 502. Depth image data captured by the depth camera 502 may be of any quantity, type, form and/or format, and may be stored in a computer-readable storage medium such as the example memory 510 of FIG. 5 described below.

Figure 6:
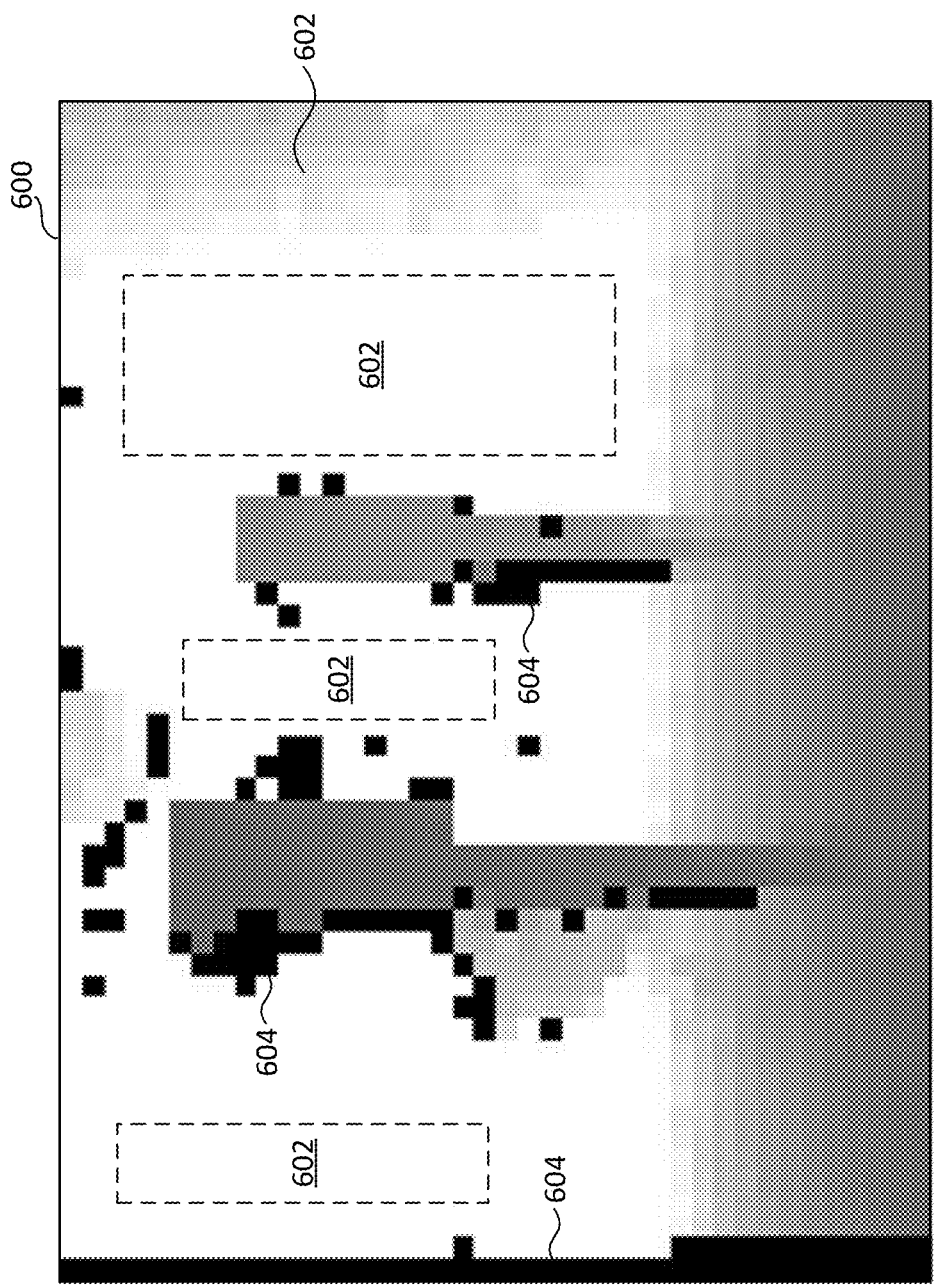
FIG. 6 illustrates an example depth image captured by the example depth camera of the example robot of FIG. 5.

FIG. 6 illustrates an example depth image 600 captured by the depth camera 502 of FIG. 5. The depth image 600 includes data and/or information indicative of the depths of objects, structures, and/or spaces that are visible in the depth image 600 relative to a viewpoint and/or location from which the depth image 600 was captured. For example, the depth image 600 includes example pixels 602 having corresponding intensity (e.g., color) values that visually represent the respective depths (e.g. distances) of objects, structures, and/or spaces visible in the depth image 600 relative to an image plane associated with the depth image 600.

In the illustrated example of FIG. 6, respective ones of the pixels 602 are color coded in greyscale with the pixels 602 including example darker-colored (e.g., black) pixels 604 and example lighter-colored (e.g., white) pixels 606, among others (e.g., other pixels having various shades and/or intensities between black and white). The darker-colored pixels 604 represent and/or indicate that an object, structure, and/or space is located at a first depth (e.g., a relatively small distance) from the image plane. The lighter-colored pixels 606 represent and/or indicate that an object, structure, and/or space is located at a second depth (e.g., a relatively large distance) from the image plane that is greater than the first depth associated with the darker-colored pixels 604. In some examples, the darker-colored pixels 604 may represent and/or indicate one or more occupied space(s) located within the field of view of the depth camera 502 and/or visible within the depth image 600, and the lighter-colored pixels 606 may represent and/or indicate one or more unoccupied space(s) located within the field of view of the depth camera 502 and/or visible within the depth image 600.

Returning to the illustrated example of FIG. 5, the example odometry sensor 504 senses, measures and/or detects data associated with a pose (e.g., an orientation and an associated location) of the robot 500 relative to a reference pose (e.g., a reference orientation and an associated reference location). Pose data (e.g., orientation data and associated location data) sensed, measured and/or detected by the odometry sensor 504 may be associated with one or more local time(s) (e.g., time stamped) at which the data was sensed, measured and/or detected by the odometry sensor 504. In some examples, a local clock is used to timestamp the depth image data and the pose data to maintain synchronization between the same. Pose data (e.g., orientation data and location data) sensed, measured and/or detected by the odometry sensor 504 may be of any quantity, type, form and/or format, and may be stored in a computer-readable storage medium such as the example memory 510 of FIG. 5 described below.

The example user interface 506 of FIG. 5 facilitates interactions and/or communications between an end user and the robot 500. The user interface 506 includes one or more input device(s) 512 via which the user may input information and/or data to the robot 500. For example, the input device(s) 512 may include a button, a switch, a microphone, and/or a touchscreen that enable(s) the user to convey data and/or commands to the example controller 508 of FIG. 5 described below, and/or, more generally, to the robot 500 of FIG. 5. The user interface 506 of FIG. 5 also includes one or more output device(s) 514 via which the user interface 506 presents information and/or data in visual and/or audible form to the user. For example, the output device(s) 514 may include a light emitting diode, a touchscreen, and/or a liquid crystal display for presenting visual information, and/or a speaker for presenting audible information. Data and/or information that is presented and/or received via the user interface 506 may be of any type, form and/or format, and may be stored in a computer-readable storage medium such as the example memory 510 of FIG. 5 described below.

The example controller 508 of FIG. 5 manages and/or controls the operations of the depth camera 502, the odometry sensor 504, the user interface 506, the memory 510, the map builder 516, the route builder 518 and/or, more generally, the robot 500 of FIG. 5. As mentioned above, the controller 508 of FIG. 5 includes the map builder 516 and the route builder 518 of FIG. 5, each of which is further described below. The controller 508 of FIG. 5 may be implemented by any type(s) and/or any number(s) of semiconductor device(s) (e.g., microprocessor(s), microcontroller(s), etc.). Control data corresponding to control signal(s), command(s), instruction(s), etc. generated, implemented, invoked, processed and/or executed by and/or at the controller 508 may be of any quantity, type, form and/or format, and may be stored in a computer-readable storage medium such as the example memory 510 of FIG. 5 described below.

The example map builder 516 of FIG. 5 manages and/or controls the generation of a map that represents the surroundings of the robot 500 of FIG. 5 within an environment. For example, the map builder 516 may manage and/or control the generation of a map (e.g., a free-space map) that represents unoccupied space into which the robot 500 may freely be routed (e.g., without collision) as the robot 500 navigates within an environment. As mentioned above, the map builder 516 of FIG. 5 includes the image manager 520, the pose identifier 522, the target identifier 524, the occupied space identifier 526, the free space developer 528, the graph generator 530, the path generator 532, and the map generator 534 of FIG. 5, each of which is further described below. In some examples, one or more operation(s) of the image manager 520, the pose identifier 522, the target identifier 524, the occupied space identifier 526, the free space developer 528, the graph generator 530, the path generator 532, the map generator 534 and/or, more generally, the map builder 516 of FIG. 5 may be implemented, executed and/or performed (e.g., in an iterative manner) in real time or near real time as the robot 500 of FIG. 5 explores and/or navigates within its environment. The map builder 516 of FIG. 5 may be implemented by any type(s) and/or any number(s) of semiconductor device(s) (e.g., microprocessor(s), microcontroller(s), etc.). Map data generated, implemented, invoked, processed and/or executed by and/or at the map builder 516 may be of any quantity, type, form and/or format, and may be stored in a computer-readable storage medium such as the example memory 510 of FIG. 5 described below.

The example image manager 520 of FIG. 5 manages and/or controls the operation of the depth camera 502 of FIG. 5. For example, the image manager 520 may signal, command and/or instruct the depth camera 502 to capture a depth image at a specified time, at a specified location, and/or in response to the occurrence of a specified event. In some examples, the image manager 520 of FIG. 5 signals, commands and/or instructs the depth camera 502 of FIG. 5 to capture a series and/or sequence of depth images based on a specified frequency and/or frame rate. In some examples, the image manager 520 signals, commands and/or instructs the depth camera 502 to capture a depth image in response to the robot 500 arriving at a specified location (e.g., a candidate location, a target location, etc.). In some examples, the image manager 520 signals, commands and/or instructs the depth camera 502 to capture a depth image in response to a modification to and/or in the orientation associated with the pose of the robot 500. The image manager 520 of FIG. 5 may be implemented by any type(s) and/or any number(s) of semiconductor device(s) (e.g., microprocessor(s), microcontroller(s), etc.). Data generated, implemented, invoked, processed and/or executed by and/or at the image manager 520 may be of any quantity, type, form and/or format, and may be stored in a computer-readable storage medium such as the example memory 510 of FIG. 5 described below.

The example pose identifier 522 of FIG. 5 identifies, detects and/or determines a pose (e.g., an orientation and an associated location) of the robot 500 of FIG. 5 that is associated and/or correlated with a depth image captured via the depth camera 502 of FIG. 5. For example, depth image data captured by the depth camera 502 may be timestamped according to the time(s) at which the depth image(s) corresponding to the depth image data was/were captured by the depth camera 502, and pose data (e.g., orientation data and associated location data) sensed, measured and/or detected by the odometry sensor 504 may be timestamped according to the time(s) at which the pose(s) (e.g., orientation(s) and associated location(s)) corresponding to the pose data was/were sensed, measured and/or detected by the odometry sensor 504. In such an example, the pose identifier 522 of FIG. 5 identifies, detects and/or determines a pose of the robot 500 that is associated and/or correlated with an identified depth image by identifying a pose having a timestamp that matches (e.g., is the same as, and/or is within a threshold time from) a timestamp of the identified depth image.

In some examples, the pose identifier 522 of FIG. 5 is invoked in response to each instance of the depth camera 502 of FIG. 5 capturing, and/or being instructed to capture, a depth image. The pose identifier 522 of FIG. 5 may be implemented by any type(s) and/or any number(s) of semiconductor device(s) (e.g., microprocessor(s), microcontroller(s), etc.). Data generated, implemented, invoked, processed and/or executed by and/or at the pose identifier 522 may be of any quantity, type, form and/or format, and may be stored in a computer-readable storage medium such as the example memory 510 of FIG. 5 described below.

The example target identifier 524 of FIG. 5 identifies, detects and/or determines a target location (e.g., a destination location) associated with the robot 500 of FIG. 5. In some examples, the target identifier 524 identifies, detects and/or determines the target location associated with the robot 500 based on target location data provided to the robot 500 via the input device(s) 512 of the user interface 506 of FIG. 5. In other examples, the target identifier 524 identifies, detects and/or determines the target location associated with the robot 500 based on preprogrammed target location data that is stored in the memory 510 of the robot 500. In such other examples, the target identifier 524 may identify, detect and/or determine the target location by accessing the preprogrammed target location data from the memory 510. The target identifier 524 of FIG. 5 may be implemented by any type(s) and/or any number(s) of semiconductor device(s) (e.g., microprocessor(s), microcontroller(s), etc.). Data generated, implemented, invoked, processed and/or executed by and/or at the target identifier 524 may be of any quantity, type, form and/or format, and may be stored in a computer-readable storage medium such as the example memory 510 of FIG. 5 described below.

The example occupied space identifier 526 of FIG. 5 identifies, detects and/or determines the location(s) of one or more occupied space(s) associated with the depth images captured by the depth camera 502 of FIG. 5. In some examples, the occupied space identifier 526 identifies, detects and/or determines the location(s) of the occupied space(s) by measuring, analyzing and/or evaluating a depth image for disparities with regard to the relative intensities of the pixels included within the depth image. For example, the occupied space identifier 526 may identify, detect and/or determine the location(s) of one or more darker-colored pixel(s) (e.g., as determined based on pixel intensity disparity measurements relative to one or more lighter-colored pixel(s)) within the depth image that represent one or more occupied space(s). In other examples, the analysis and/or evaluation performed by the occupied space identifier 526 of FIG. 5 in connection with identifying, detecting and/or determining the location(s) of the occupied space(s) may be based on a different pixel intensity coding scheme. For example, the analysis and/or evaluation performed by the occupied space identifier 526 may be based on a coded RGB color scheme (e.g., coded such that one or more blue-colored pixels represent occupied space(s)) when the depth images captured by the depth camera 502 of FIG. 5 are RGB-D images.

In some examples, the occupied space identifier 526 of FIG. 5 associates the identified and/or determined location(s) of the occupied space(s) for a depth image with the pose (e.g., the orientation and the associated location) of the robot 500 of FIG. 5 corresponding to the depth image. For example, the occupied space identifier 526 may access and/or obtain the pose of the robot 500 associated with a particular depth image, as identified and/or determined via the pose identifier 522 of FIG. 5 described above. The occupied space identifier 526 may associate the identified pose of the robot 500 with the identified and/or determined location(s) of the occupied space(s) for that particular depth image. In some examples, the occupied space identifier 526 of FIG. 5 processes, analyzes and/or evaluates respective ones of the depth images and the associated poses in a sequential manner (e.g., based on the timestamps of the depth images).

In some examples, the occupied space identifier 526 of FIG. 5 is invoked in response to each instance of the depth camera 502 of FIG. 5 capturing, and/or being instructed to capture, a depth image. The occupied space identifier 526 of FIG. 5 may be implemented by any type(s) and/or any number(s) of semiconductor device(s) (e.g., microprocessor(s), microcontroller(s), etc.). Data generated, implemented, invoked, processed and/or executed by and/or at the occupied space identifier 526 may be of any quantity, type, form and/or format, and may be stored in a computer-readable storage medium such as the example memory 510 of FIG. 5 described below.

The example free space developer 528 of FIG. 5 constructs, builds and/or develops a free space network corresponding to and/or representing unoccupied space (e.g., free space) into which the robot 500 of FIG. 5 can freely move without the occurrence of a collision. In some examples, the free space developer 528 constructs, builds and/or develops the free space network based on the occupied space(s) identified and/or determined via the occupied space identifier 526 of FIG. 5 described above. For example, the free space developer 528 may construct, build and/or develop the free space network by deducing the location(s) of one or more unoccupied space(s) in the depth images based on the identified and/or determined location(s) of the occupied space(s) of the depth images.

In some examples, the free space developer 528 of FIG. 5 constructs, builds and/or develops the free space network by discretizing the unoccupied space(s) into a plurality of voxels. The voxels may be based on and/or defined by corresponding ones of the pixels from the depth images that fill the unoccupied space(s). In some examples, the free space developer 528 of FIG. 5 assigns nodes to the center points of respective ones of the voxels. The voxels and/or the voxel nodes established by the free space developer 528 provide a framework for defining the free space network, and/or for defining and/or generating one or more graph(s) and/or path(s) within the free space network, as further described below. In some examples, the voxels and/or the voxel nodes represent candidate locations (e.g., candidates for routing) to which the robot 500 of FIG. 5 can be freely moved without the occurrence of a collision. In some examples, the free space developer 528 of FIG. 5 updates the free space network by adding new voxels and/or voxel nodes to the free space network, and/or by deleting existing voxels and/or voxel nodes from the free space network. In some examples, the free space developer 528 updates the free space network based on a node cloud list, a new nodes list, an old nodes list, a neighbors list, and/or a master level key, as further described below. In some examples, the free space developer 528 dynamically updates the free space network as the robot 500 of FIG. 5 is navigating within an environment.

In some examples, the free space developer 528 of FIG. 5 is invoked in response to each instance of the occupied space identifier 526 of FIG. 5 identifying, detecting and/or determining the location(s) of the occupied space(s) associated with a depth image. The free space developer 528 of FIG. 5 may be implemented by any type(s) and/or any number(s) of semiconductor device(s) (e.g., microprocessor(s), microcontroller(s), etc.). Data generated, implemented, invoked, processed and/or executed by and/or at the free space developer 528 may be of any quantity, type, form and/or format, and may be stored in a computer-readable storage medium such as the example memory 510 of FIG. 5 described below.

Figure 7:
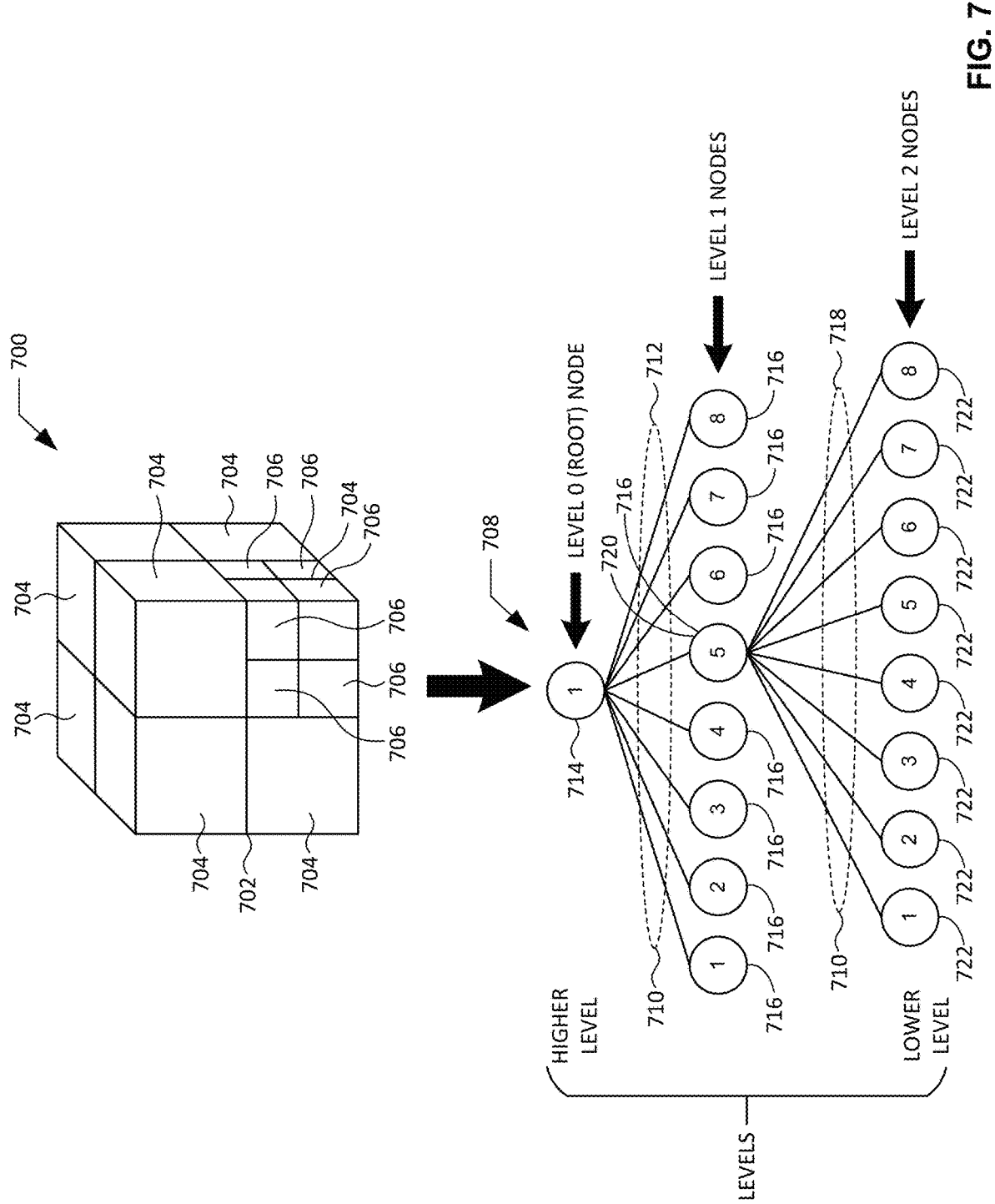
FIG. 7 illustrates an example free space network developed by the example free space developer of the example robot of FIG. 5.

FIG. 7 illustrates an example free space network 700 developed by the example free space developer 528 of the example robot 500 of FIG. 5. In the illustrated example of FIG. 7, the free space network 700 includes an example primary voxel 702 having a primary voxel node (e.g., a "level 0" and/or root node). The primary voxel 702 and/or, more generally, the free space network 700 of FIG. 7 includes example secondary voxels 704 having corresponding secondary voxel nodes (e.g., "level 1" nodes). One of the secondary voxels 704 and/or, more generally, the free space network 700 of FIG. 7 includes example tertiary voxels 706 having corresponding tertiary voxel nodes (e.g., "level 2" nodes).

In the illustrated example of FIG. 7, the free space network 700 can be represented by an example master level key 708 that uniquely identifies and/or correlates the primary voxel 702 and/or the primary voxel node, respective ones of the secondary voxels 704 and/or the secondary voxel nodes, and respective ones of the tertiary voxels 706 and/or the tertiary voxel nodes relative to the free space network 700. For example, each voxel node included in the free space network 700 can be represented as a unique level key identifier having the form:

(level, coordinate$_x$, coordinate$_y$, coordinate$_z$)

The master level key 708 of FIG. 7 organizes the primary voxel 702 and/or the primary voxel node, respective ones of the secondary voxels 704 and/or the secondary voxel nodes, and respective ones of the tertiary voxels 706 and/or the tertiary voxel nodes of the free space network 700 based on levels. In the illustrated example of FIG. 7, the master level key 708 includes a highest level and/or a highest level key associated with the primary voxel 702. The highest level represents the root node of the free space network 700. The master level key 708 further includes a lowest level and/or a lowest level key associated with the tertiary voxels 706 and/or the tertiary voxel nodes. The lowest level represents the maximum granularity of the free space network 700. In the illustrated example of FIG. 7, a third level and/or third level key associated with the secondary voxels 704 and/or the tertiary voxel nodes resides between the highest level and the lowest level. In other examples, the master level key 708 may include a different number (e.g., 0, 2, 3, etc.) of levels residing between the highest level and the lowest level.

The master level key 708 of FIG. 7 includes example logical connections 710 that identify parent/child relationships between respective ones of the voxels and/or voxel nodes at different levels (e.g., level 0, level 1, level 2, etc.) of the master level key 708. The logical connections 710 of the master level key 708 correspond to the classification relationships (e.g., primary, secondary, tertiary, etc.) associated with respective ones of the voxels and/or voxel nodes of the free space network 700. For example, the master level key 708 of FIG. 7 includes example first logical connections 712 between an example "level 0" node 714 (e.g., a root node) corresponding to the primary voxel 702 of the free space network 700 and example "level 1" nodes 716 corresponding to the secondary voxels 704 of the free space network 700. The master level key 708 of FIG. 7 further includes example second logical connections 718 between an example node 720 (e.g., node 5 of level 1 of FIG. 7) of the "level 1" nodes 716 corresponding to the secondary voxels 704 of the free space network 700 and example "level 2" nodes 722 corresponding to the tertiary voxels 706 of the free space network 700. The master level key 708 of FIG. 7 accordingly identifies the "level 1" nodes 716 as child nodes of the "level 0" node 714, and further identifies the "level 2" nodes 722 as child nodes of the node 720 of the "level 1" nodes 716.

Returning to the illustrated example of FIG. 5, the example graph generator 530 of FIG. 5 generates a graph representing the free space network developed by the free space developer 528 of FIG. 5. In some examples, the graph generator 530 generates the graph by connecting (e.g., logically connecting, visually connecting, etc.) respective ones of the voxel nodes of the free space network to neighboring ones of the voxel nodes of the free space network. The graph generated by the graph generator 530 of FIG. 5 provides a framework for defining and/or generating one or more path(s) within the free space network, as further described below. In some examples, the graph defines a collection of candidate paths along which the robot 500 of FIG. 5 can be freely moved without the occurrence of a collision.

In some examples, the graph generator 530 of FIG. 5 is invoked in response to each instance of the free space developer 528 of FIG. 5 building, constructing and/or developing the free space network. In some examples, the graph generator 530 of FIG. 5 is invoked in connection with the map generator 534 of FIG. 5 generating a map of the free space network, as further described below. The graph generator 530 of FIG. 5 may be implemented by any type(s) and/or any number(s) of semiconductor device(s) (e.g., microprocessor(s), microcontroller(s), etc.). Data generated, implemented, invoked, processed and/or executed by and/or at the graph generator 530 may be of any quantity, type, form and/or format, and may be stored in a computer-readable storage medium such as the example memory 510 of FIG. 5 described below.

The example path generator 532 of FIG. 5 generates one or more path(s) within the free space network developed by the free space developer 528 of FIG. 5. In some examples, the path(s) generated by the path generator 532 follow(s), track(s) and/or extend(s) along portions of the graph generated by the graph generator 530 of FIG. 5. For example, the path generator 532 may generate one or more path(s) that follow(s), track(s) and/or extend(s) along various ones of the voxel node connections represented by the graph, from a reference location (e.g., a current location) of the robot 500 of FIG. 5 (e.g., as sensed, measured and/or detected by the odometry sensor 504 of FIG. 5 and/or identified, detected and/or determined by the pose identifier 522 of FIG. 5) to the target location of the robot 500 of FIG. 5 (as identified, detected and/or determined by the target identifier 524 of FIG. 5). In some examples, the path generator 532 of FIG. 5 generates a path within the free space network that is determined (e.g., determined by the path generator 532) to be the shortest path between the reference location of the robot 500 and the target location of the robot 500 that follows, tracks and/or extends along various ones of the voxel node connections represented by the graph.

In some examples, the path generator 532 of FIG. 5 is invoked in response to each instance of the graph generator 530 of FIG. 5 generating a graph of the free space network. In some examples, the path generator 532 of FIG. 5 is invoked in connection with the map generator 534 of FIG. 5 generating a map of the free space network, as further described below. The path generator 532 of FIG. 5 may be implemented by any type(s) and/or any number(s) of semiconductor device(s) (e.g., microprocessor(s), microcontroller(s), etc.). Data generated, implemented, invoked, processed and/or executed by and/or at the path generator 532 may be of any quantity, type, form and/or format, and may be stored in a computer-readable storage medium such as the example memory 510 of FIG. 5 described below.

The example map generator 534 of FIG. 5 generates a map representing the free space network (e.g., a map of the free space) developed by the free space developer 528 of FIG. 5. In some examples, the map generated by the map generator 534 is structured, configured and/or presented as a hierarchical representation (e.g., a logical and/or visual hierarchical representation) of the unoccupied space (e.g., free space) that surrounds the robot 500 of FIG. 5, and/or into which the robot 500 can be freely moved without the occurrence of a collision. In some examples, the map generated by the map generator 534 includes a representation (e.g., a logical and/or visual representation) of the occupied space(s) identified, detected and/or determined by the occupied space identifier 526 of FIG. 5. In some examples, the map generated by the map generator 534 includes a representation (e.g., a logical and/or visual representation) of the graph generated by the graph generator 530 of FIG. 5. In some examples, the map generated by the map generator 534 includes a representation (e.g., a logical and/or visual representation) of the path(s) generated by the path generator 532 of FIG. 5.

In some examples, the map generator 534 of FIG. 5 is invoked in response to each instance of the free space developer 528 of FIG. 5 building, constructing and/or developing the free space network. In some examples, the map generator 534 of FIG. 5 is invoked in connection with the graph generator 530 of FIG. 5 generating a graph of the free space network, and/or in connection with the path generator 532 of FIG. 5 generating a path within the free space network. The map generator 534 of FIG. 5 may be implemented by any type(s) and/or any number(s) of semiconductor device(s) (e.g., microprocessor(s), microcontroller(s), etc.). Data generated, implemented, invoked, processed and/or executed by and/or at the map generator 534 may be of any quantity, type, form and/or format, and may be stored in a computer-readable storage medium such as the example memory 510 of FIG. 5 described below.

Figure 8:
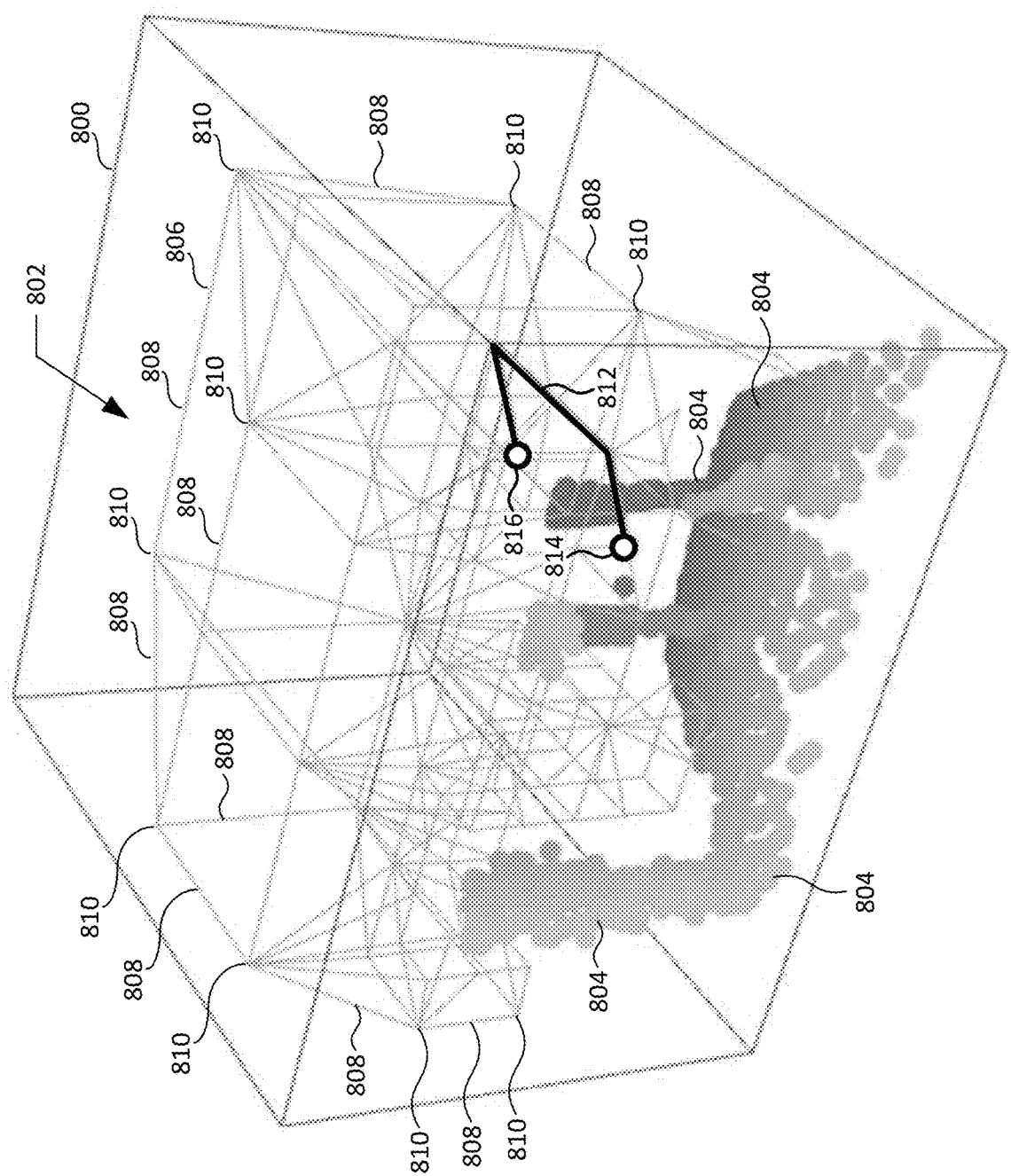
FIG. 8 illustrates an example map generated by the example map generator of the example robot of FIG. 5.

FIG. 8 illustrates an example map 800 generated by the map generator 534 of the robot 500 of FIG. 5. In the illustrated example of FIG. 8, the map 800 includes an example free space network 802 developed by the free space developer 528 of FIG. 5. The free space network 802 of FIG. 8 represents unoccupied space (e.g., free space) that surrounds the robot 500 of FIG. 5, and/or into which the robot 500 can be freely moved without the occurrence of a collision. The map 800 of FIG. 8 also includes example occupied spaces 804 identified, detected and/or determined by the occupied space identifier 526 of FIG. 5. The occupied spaces 804 represent structures and/or obstacles with which the robot 500 could potentially collide if the robot 500 were to deviate and/or depart from the free space network 802. The map 800 of FIG. 8 also includes an example graph 806 generated by the graph generator 530 of FIG. 5. The graph 806 of FIG. 8 includes example voxel node connections 808 that extend between and/or connect respective ones of example voxel nodes 810 included within the free space network 802 of the map 800 of FIG. 8. The voxel node connections 808 of the graph 806 of FIG. 8 define a collection of candidate paths along which the robot 500 can be freely moved without the occurrence of a collision. The map 800 of FIG. 8 also includes an example path 812 generated by the path generator 532 of FIG. 5. The path 812 of FIG. 8 is the shortest path between an example reference location 814 of the robot 500 and an example target location 816 of the robot 500 that follows, tracks and/or extends along various ones of the voxel node connections 808 represented by the graph 806 of FIG. 8.

Returning to the illustrated example of FIG. 5, the example route builder 518 of FIG. 5 manages and/or controls the generation of a route to be followed and/or tracked by the robot 500 of FIG. 5 within an environment. For example, the route builder 518 may manage and/or control the generation of a dynamically-feasible route that maintains a given bounded error as the robot 500 navigates from a reference location (e.g., a current location) to either a candidate location (e.g., an intermediate location) or a target location (e.g., a destination location) within an environment. In some examples, the route builder 518 of FIG. 5 determines and/or generates the route to be followed and/or tracked by the robot 500 based on the map generated by the map generator 534 and/or, more generally, by the map builder 516 of FIG. 5. As mentioned above, the route builder 518 of FIG. 5 includes the field of view evaluator 536, the orientation manager 538, the candidate evaluator 540, the route generator 542, and the dynamic filter 544 of FIG. 5, each of which is further described below. In some examples, one or more operation(s) of the field of view evaluator 536, the orientation manager 538, the candidate evaluator 540, the route generator 542, the dynamic filter 544 and/or, more generally, the route builder 5186 of FIG. 5 may be implemented, executed and/or performed (e.g., in an iterative manner) in real time or near real time as the robot 500 of FIG. 5 explores and/or navigates within its environment. The route builder 518 of FIG. 5 may be implemented by any type(s) and/or any number(s) of semiconductor device(s) (e.g., microprocessor(s), microcontroller(s), etc.). Route data generated, implemented, invoked, processed and/or executed by and/or at the route builder 518 may be of any quantity, type, form and/or format, and may be stored in a computer-readable storage medium such as the example memory 510 of FIG. 5 described below.

The example field of view evaluator 536 of FIG. 5 identifies, detects and/or determines the field of view of the depth camera 502 of the robot 500 of FIG. 5. For example, the field of view evaluator 536 may identify, detect and/or determine the field of view of the depth camera 502 of the robot 500 based on the most current depth image captured by the depth camera 502 and the associated pose (e.g., the orientation and the associated location) identified by the pose identifier 522 of FIG. 5. The field of view evaluator 536 may additionally or alternatively identify, detect and/or determine the field of view of depth camera 502 of the robot 500 based on the map generated and/or managed by the map builder 516 of FIG. 5. For example, the field of view evaluator 536 may identify, detect and/or determine the field of view of the depth camera 502 of the robot 500 based on the occupied space(s) identified by the occupied space identifier 526, the free space network developed by the free space developer 528, the graph generated by the graph generator 530, the path(s) generated by the path generator 532, and/or the map generated by the map generator 534 of the map builder 516 of FIG. 5.

In some examples, the field of view evaluator 536 of FIG. 5 identifies, detects and/or determines the value of a size attribute (e.g., a width, a height, a depth, etc.) of the field of view, and further identifies, detects and/or determines whether the value of the size attribute satisfies a size attribute threshold. For example, the field of view evaluator 536 may identify, detect and or determine whether a depth of the field of view falls below a depth threshold. As another example, the field of view evaluator 536 may identify, detect and/or determine whether a width of the field of view falls below a width threshold. In some examples, a violation of the size attribute threshold (e.g., a failure to satisfy the size attribute threshold) indicates that the depth camera 502 and/or, more generally, the robot 500 of FIG. 5 is/are at risk of colliding with a structure and/or an obstacle located within the field of view of the depth camera 502 of the robot 500.

In some examples, the field of view evaluator 536 of FIG. 5 identifies, detects and/or determines whether the target location (e.g., the destination location) of the robot 500 of FIG. 5 is within the field of view of the depth camera 502 of the robot 500. For example, the field of view evaluator 536 may identify, detect and/or determine whether the target location of the robot 500 is within the field of view based on the identification of the target location provided by the target identifier 524 of FIG. 5, and/or based on the path(s) generated by the path generator 532 of FIG. 5 and included on the map generated by the map generator 534 of FIG. 5. In some examples, an absence of the target location from the field of view indicates that the robot 500 must be routed to a candidate location (e.g., an intermediate location) within the field of view before the robot 500 can be routed to the target location (e.g., the destination location).

In some examples, the field of view evaluator 536 of FIG. 5 is invoked in response to each instance of the map builder 516 of FIG. 5 generating, modifying and/or updating a map representing the surroundings of the robot 500 of FIG. 5. The field of view evaluator 536 of FIG. 5 may be implemented by any type(s) and/or any number(s) of semiconductor device(s) (e.g., microprocessor(s), microcontroller(s), etc.). Data generated, implemented, invoked, processed and/or executed by and/or at the field of view evaluator 536 may be of any quantity, type, form and/or format, and may be stored in a computer-readable storage medium such as the example memory 510 of FIG. 5 described below.

The example orientation manager 538 of FIG. 5 manages and/or controls the orientation of the robot 500 of FIG. 5. For example, the orientation manager 538 may signal, command and/or instruct one or more motor(s) and/or motive component(s) (e.g., rotor(s), wheel(s), track(s), etc.) of the robot 500 to operate in a manner that modifies (e.g., rotates) the orientation of the robot 500 relative to a reference orientation. In some examples, the orientation manager 538 signals, commands and/or instructs the motor(s) and/or motive component(s) of the robot 500 to modify (e.g., rotate) the orientation of the robot 500 in response to the field of view evaluator 536 of FIG. 5 identifying, detecting and/or determining that the value of a size attribute of the field of view of the depth camera 502 of the robot 500 violates (e.g., fails to satisfy) a size attribute threshold.

In some examples, the orientation manager 538 of FIG. 5 is invoked in response to each instance of the field of view evaluator 536 of FIG. 5 identifying, detecting and/or determining that the value of a size attribute of the field of view of the depth camera 502 of the robot 500 of FIG. 5 violates (e.g., fails to satisfy) a size attribute threshold. The orientation manager 538 of FIG. 5 may be implemented by any type(s) and/or any number(s) of semiconductor device(s) (e.g., microprocessor(s), microcontroller(s), etc.). Data generated, implemented, invoked, processed and/or executed by and/or at the orientation manager 538 may be of any quantity, type, form and/or format, and may be stored in a computer-readable storage medium such as the example memory 510 of FIG. 5 described below.

The example candidate evaluator 540 of FIG. 5 identifies, detects and/or determines one or more candidate location(s) located within the field of view of the depth camera 502 of the robot 500 of FIG. 5. For example, the candidate evaluator 540 may identify, detect and/or determine one or more candidate location(s) located within the field of view of the depth camera 502 of the robot 500 by translating the path generated by the path generator 532 of FIG. 5 and/or included in the map generated by the map generator 534 of FIG. 5 into one or more candidate location(s) located within the field of view of the depth camera 502 of the robot 500. In some examples, the candidate location(s) identified, detected and/or determined by the candidate evaluator 540 of FIG. 5 correspond to one or more of the voxel(s) and/or the voxel node(s) that are located along the path generated by the path generator 532 of FIG. 5 and that are further located with the field of view of the depth camera 502 of the robot 500 of FIG. 5. Limiting and/or restricting the identification, detection and/or determination of the candidate location(s) to the space defined by and/or corresponding to the field of view of the depth camera 502 of the robot 500 of FIG. 5 advantageously reduces measurement uncertainties, increases the likelihood of the candidate location(s) being unoccupied, and increases the speed (e.g., by reducing processing requirements) at which the candidate evaluator 540 of FIG. 5 identifies, detects and/or determines the candidate location(s).

In some examples, the candidate evaluator 540 of FIG. 5 also identifies, detects and/or determines a preferred candidate location from among the candidate location(s). In some examples, the preferred candidate location is the candidate location within the field of view of the depth camera 502 of the robot 500 of FIG. 5 that is closest (e.g., most proximate) to the target location of the robot 500. For example, the candidate evaluator 540 may identify, detect and/or determine the proximity of each candidate location within the field of view of the depth camera 502 of the robot 500 relative to the target location of the robot 500 identified, detected and/or determined by the target identifier 524 of FIG. 5 and/or included on the map generated by the map generator 534 of FIG. 5. In such an example, the candidate evaluator 540 may identify, detect and/or identify the candidate location that is determined to be closest (e.g., most proximate) to the target location of the robot 500 as the preferred candidate location.

In some examples, the candidate evaluator 540 of FIG. 5 is invoked in response to each instance of the field of view evaluator 536 of FIG. 5 identifying, detecting and/or determining that the target location of the robot 500 of FIG. 5 is not within the field of view of the depth camera 502 of the robot 500 of FIG. 5. The candidate evaluator 540 of FIG. 5 may be implemented by any type(s) and/or any number(s) of semiconductor device(s) (e.g., microprocessor(s), microcontroller(s), etc.). Data generated, implemented, invoked, processed and/or executed by and/or at the candidate evaluator 540 may be of any quantity, type, form and/or format, and may be stored in a computer-readable storage medium such as the example memory 510 of FIG. 5 described below.

The example route generator 542 of FIG. 5 generates a route to be followed and/or tracked by the robot 500 of FIG. 5 as the robot 500 of FIG. 5 navigates within an environment. In some examples, the route generator 542 generates a route from a reference location (e.g., a current location) identified, detected and/or determined by the pose identifier 522 of FIG. 5 to a preferred candidate location (e.g., an intermediate location) identified, detected and/or determined by the candidate evaluator 540 of FIG. 5. In some examples, the route generator 542 generates a route from a reference location (e.g., a current location) identified, detected and/or determined by the pose identifier 522 of FIG. 5 to a target location (e.g., a destination location) identified, detected and/or determined by the target identifier 524 of FIG. 5. The route builder 518 of FIG. 5 signals, commands and/or instructs one or more motor(s) and/or motive component(s) (e.g., rotor(s), wheel(s), track(s), etc.) of the robot 500 of FIG. 5 to operate in a manner that moves the robot 500 such that the robot 500 tracks and/or follows the route (e.g., the most current route) generated by the route generator 542 of FIG. 5.

In some examples, the route generator 542 of FIG. 5 is invoked in response to each instance of the field of view evaluator 536 of FIG. 5 identifying, detecting and/or determining that the value of a size attribute (e.g., a width, a height, a depth, etc.) of the field of view satisfies a size attribute threshold. In some examples, the route generator 542 of FIG. 5 is invoked in response to each instance of the field of view evaluator 536 of FIG. 5 identifying, detecting and/or determining that the target location to which the robot 500 of FIG. 5 is to be routed is within the field of view of the depth camera 502 of the robot 500 of FIG. 5. In some examples, the route generator 542 of FIG. 5 is invoked in response to each instance of the candidate evaluator 540 of FIG. 5 identifying, detecting and/or determining a preferred candidate location to which the robot 500 of FIG. 5 is to be routed. The route generator 542 of FIG. 5 may be implemented by any type(s) and/or any number(s) of semiconductor device(s) (e.g., microprocessor(s), microcontroller(s), etc.). Data generated, implemented, invoked, processed and/or executed by and/or at the route generator 542 may be of any quantity, type, form and/or format, and may be stored in a computer-readable storage medium such as the example memory 510 of FIG. 5 described below.

The example dynamic filter 544 of FIG. 5 converts the route generated by the route generator 542 of FIG. 5 into a dynamically-feasible route that maintains a given bounded error as the robot 500 of FIG. 5 navigates (e.g., along waypoints) from the reference location to either the preferred candidate location or the target location. For example, the dynamic filter 544 may identify, detect and/or determine waypoints associated with the route generated by the route generator 542. In some examples, the waypoints correspond to the candidate locations identified, detected and/or determined by the candidate evaluator 540 of FIG. 5 that have been translated from the path generated by the path generator 532 of FIG. 5, and/or that are included in the map generated by the map generator 534 of FIG. 5. The dynamic filter 544 may also identify, detect and/or determine dynamic constraints of the robot 500 of FIG. 5 including, for example the maximum error of separation ($E_{max}$) between the waypoint(s) and the actual route followed and/or navigated by the robot 500, the maximum velocity ($V_{max}$) per axis of the robot 500, the maximum acceleration ($A_{max}$) per axis of the robot 500, and/or the maximum jerk ($J_{max}$) per axis of the robot 500. In some examples, the dynamic filter 544 identifies, detects and/or determines the dynamic constraints of the robot 500 based on preprogrammed dynamic constraint data that is stored in the memory 510 of the robot 500.

Figure 9:
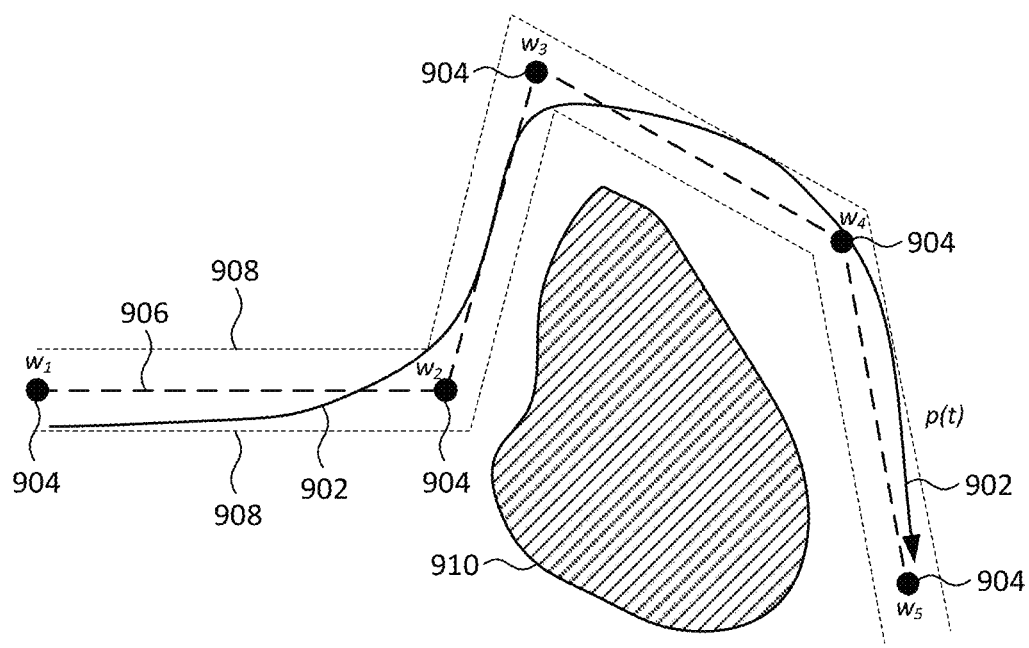
FIG. 9 illustrates an example dynamically-feasible route generated by the example dynamic filter of FIG. 5 that is based on example waypoints of an example route generated by the example route generator of FIG. 5.

The dynamic filter 544 generates (e.g., outputs) a dynamically-feasible route that is based on the identified waypoints and that is compliant with the identified dynamic constraints (e.g., $E_{max}$, $V_{max}$, $A_{max}$, $J_{max}$) of the robot 500 of FIG. 5. For example, FIG. 9 illustrates an example dynamically-feasible route 902 (e.g., referenced as p(t)) generated by the dynamic filter 544 of FIG. 5 that is based on example waypoints 904

(e.g., referenced as $w_1$, $w_2$, $w_3$, $w_4$, $w_5$,) of an example route 906 generated by the route generator 542 of FIG. 5. The dynamically-feasible route 902 of FIG. 9 is compliant with the identified dynamic constraints of the robot 500. The robot 500 maintains an example given bounded error 908 relative to the route 906 as the robot 500 follows and/or tracks the dynamically-feasible route 902 of FIG. 9 between successive ones of the waypoints 904, thereby reducing (e.g., eliminating) the possibility of the robot 500 colliding with one or structure(s) and/or object(s) including, for example, the example obstacle 910.

In some examples, the dynamic filter 544 implements an array of low pass filters in connection with generating the dynamically-feasible route. For example, the dynamic filter 544 may implement an array of low pass filters that may be expressed and/or defined as follows:

$$u(t) \to LPF \to x(t) = \begin{bmatrix} x_1(t) \\ x_2(t) \\ x_3(t) \\ x_4(t) \end{bmatrix} \quad \text{Equation 1}$$

In Equation 1, u(t) is an input signal to be filtered, LPF is an array of low pass filters, and x(t) is a state vector with $x_1(t)$ as the filtered output. The inner dynamics of the filter are provided by: $\dot{x}_1 = x_2$, $\dot{x}_2 = x_3$, $\dot{x}_3 = x_4$, $\dot{x}_4 = k_1(x_1-u)+k_2x_2$ $k_3x_3$ $k_4x_4$, where $x_1$ is position, $x_2$ is velocity, $x_3$ is acceleration, $x_4$ is jerk, and $k_1$, $k_2$, $k_3$, $k_4$ are chosen Hurwitz gains (e.g., stable gains).

Figure 10:
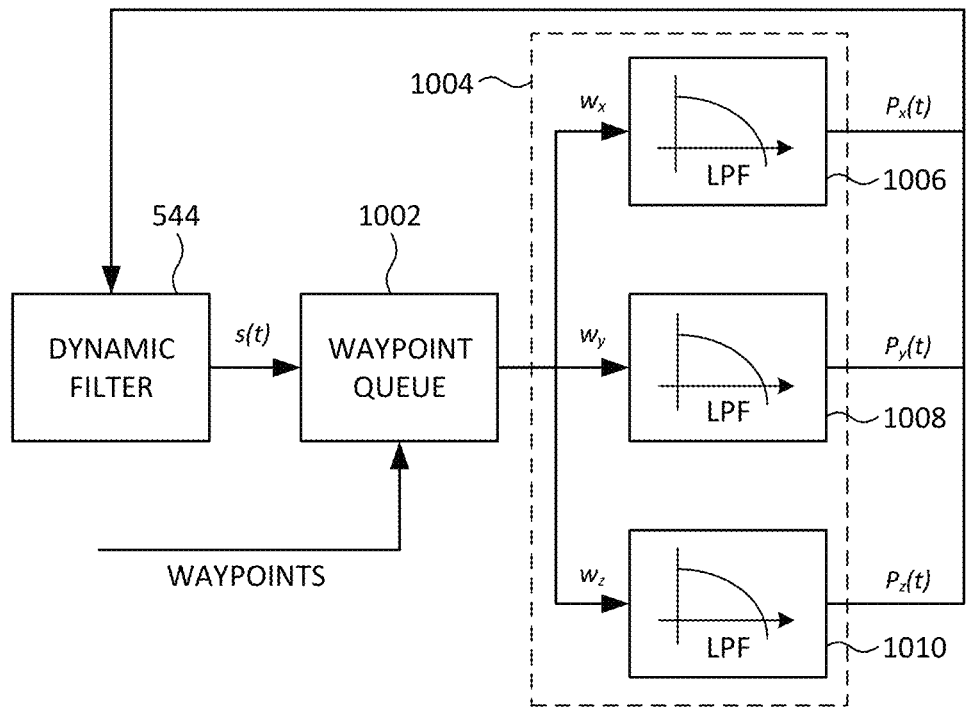
FIG. 10 is a block diagram of the example dynamic filter of FIG. 5 implementing an example waypoint queue and an example low pass filter array.

FIG. 10 is a block diagram of the dynamic filter 544 of FIG. 5 implementing an example waypoint queue 1002 and an example low pass filter array 1004. The waypoint queue 1002 includes waypoints identified, detected and/or determined by the dynamic filter 544 of FIG. 5, as described above. The low pass filter array 1004 of FIG. 10 includes an example first low pass filter 1006, an example second low pass filter 1008, and an example third low pass filter 1010. The first, second and third low pass filters 1006, 1008, 1010 may respectively implement a function corresponding to Equation 1 described above.

In the illustrated example of FIG. 10, the dynamic filter 544 generates a parametrization function s(t) where s is the arc length associated with the route. Thus, s(t) is the output of the dynamic filter, which defines the location along the route (e.g., the route provided by the waypoints in the waypoint queue 1002) to be transmitted as a virtual command to the robot 500. Kinematic restrictions for nonholonomic robots can be handled by the dynamic filter 544. For example, arc generation via the dynamic filter 544 may consider minimum turning radius for a wheeled robot (e.g., a UGV). In the illustrated example of FIG. 10, the first, second and third low pass filters 1006, 1008, 1010 of the low pass filter array 1004 respectively filter (e.g., one low pass filter per coordinate) the output of the waypoint queue 1002, thereby generating the actual location command to be provided to the robot 500, along with the full dynamic state of the low pass filter array 1004. In some examples, the full dynamic state of the low pass filter array 1004 represents position, velocity, acceleration and jerk.

In some examples, the low pass filter array 1004 implemented via the dynamic filter 544 is a linear system having an invariant set provided by a hyper-ellipse in the state space with no input. Thus, if the state of the low pass filter array 1004 begins inside the invariant set, the state of the low pass filter array 1004 will remain inside the invariant set. In some examples, the invariant set for the low pass filter array 1004 may be expressed and/or defined as follows:

$$V(x) = x^T P x < 1 \quad \text{Equation 2:}$$

In Equation 2, P is a positive definite matrix solution of a Lyapunov equation that may be expressed and/or defined as follows:

$$PA^T + AP = -Q \quad \text{Equation 3:}$$

In Equation 3, A is a matrix expressed and/or defined as follows:

$$A = \begin{bmatrix} 0 & 1 & 0 & 0 \\ 0 & 0 & 1 & 0 \\ 0 & 0 & 0 & 1 \\ k_1 & k_2 & k_3 & k_4 \end{bmatrix}$$

In Equation 3, Q is any other positive definite matrix. In some examples, a hyper-ellipse representing the invariant set V(x) of Equation 2 may be built as a composite hyper-ellipse that includes a hyper-ellipse for each of the three coordinate axes. In such examples, the invariant set V(x) may be determined as $V_x + V_y + V_z$.

Figure 11:
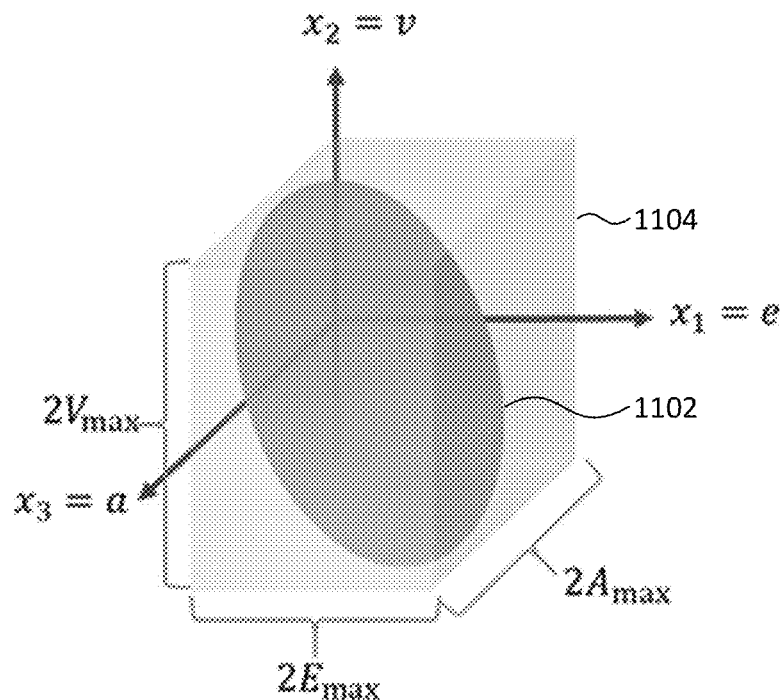
FIG. 11 illustrates an example hyper-ellipse associated with the example low pass filter array of FIG. 10.

FIG. 11 illustrates an example hyper-ellipse 1102 associated with the example low pass filter array 1004 of FIG. 10. In the illustrated example of FIG. 11, if the input of the state space is zero, the first state represents the position error between the output of the state space and the input of the state space. The hyper-ellipse 1102 of FIG. 11 can be configured to fit within an example rectangular-shaped volume 1104 (e.g., a box) that complies with the dynamic constraints of the robot 500. Thus, if the state of the low pass filter array 1004 begins inside the hyper-ellipse 1102 of FIG. 11, the state of the low pass filter array 1004 will remain inside the hyper-ellipse 1102 and inside the rectangular-shaped volume 1104, generating a dynamically-feasible route that is compliant with the dynamic constraints of the robot 500.

In an actual operational environment, the input of the state space is typically not zero, but is instead the chosen waypoint w(s(t)). In some examples, the dynamic filter 544 implements and/or executes a function that may be expressed and/or defined as follows:

Equation 4:

$$\dot{s}(t) = \max\{\rho - V(x), 0\}$$

As the value of $\rho \times V(x)$ with $\rho < 1$ approaches 0, (e.g., as the state approaches the boundary of the hyper-ellipse V(x) $<\rho$, the dynamics of s(t) approach the case $\dot{s}(t)=0$. At the boundary, the dynamics are exactly $\dot{s}(t)=0$. Thus, the state remains inside the hyper-ellipse. The parameter $\rho$ is chosen to solve issues provided by the discretization of the low pass filters, such that inside the band $\rho < V(x) < 1$, the dynamic filter 544 will output exactly $\dot{s}(t)=0$, thereby accounting for numerical errors. The max function of Equation 4 is introduced to force the arc-length evolution to be monotonically increasing. As a result, the route always advances.

Figure 12:
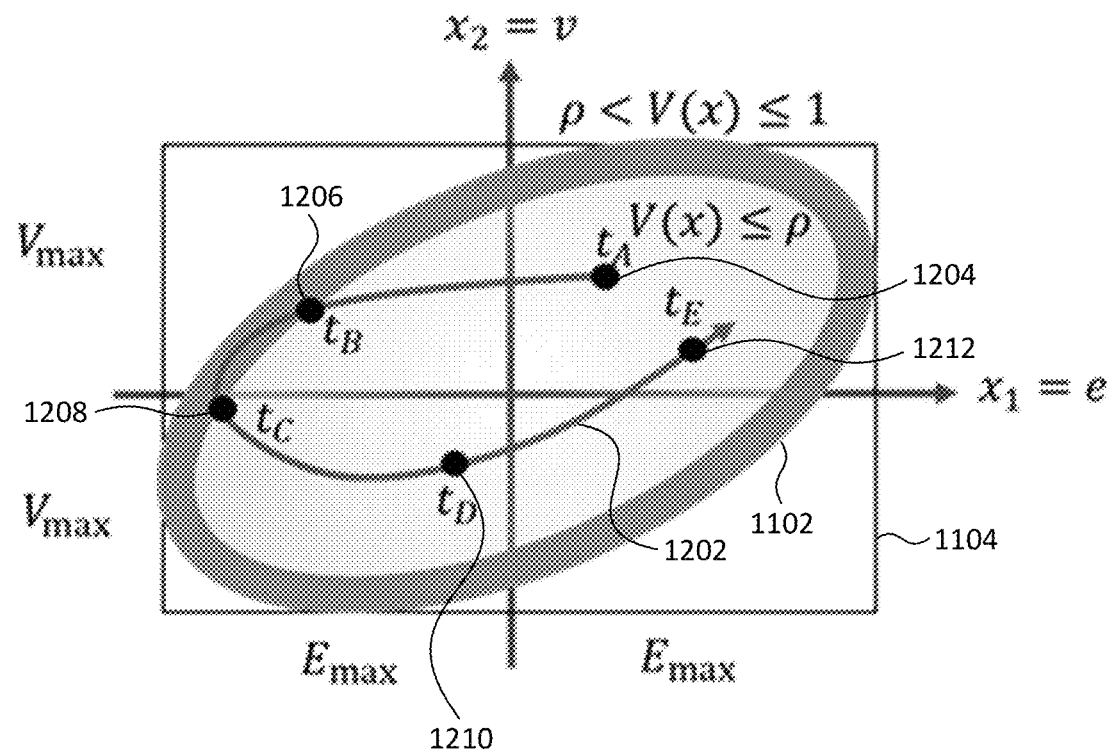
FIG. 12 illustrates behavior of an example dynamically-feasible route processed by the example dynamic filter of FIG. 5 relative to the example hyper-ellipse of FIG. 11.

FIG. 12 illustrates behavior of an example dynamically-feasible route 1202 generated by the example dynamic filter of FIG. 5 relative to the example hyper-ellipse 1102 of FIG. 11. In the illustrated example of FIG. 12, only the position error and the velocity axes are shown for simplicity. In the illustrated example of FIG. 12, an example first point 1204 associated with a time $t=t_A$ is separated from the boundary of the hyper-ellipse 1102. The state can accordingly move toward the boundary of the hyper-ellipse 1102. As the state approaches the boundary of the hyper-ellipse 1102, the arc length slowly stabilizes until $\dot{s}(t)=0$ at an example second point 1206 associated with a time $t=t_B$. The state is then forced to return to the boundary of the hyper-ellipse 1102. The state returns inside the boundary of the hyper-ellipse 1102 at an example third point 1208 associated with a time $t=t_C$. In response to the dynamics of the arc length remaining substantially constant, the state moves toward the origin at an example fourth point 1210 associated with a time $t=t_D$. As the dynamics of the arc length being to increase, the state moves away from the origin at an example fifth point 1212 associated with a time $t=t_E$. The behavior illustrated in FIG. 12 is repeated along all the entire route generated by the dynamic filter 544 of FIG. 5, thereby providing the robot 500 of FIG. 5 with a route that is compliant with the dynamic constraints of the robot 500.

In some examples, the dynamic filter 544 of FIG. 5 is invoked in connection with and/or in response to each instance of the route generator 542 of FIG. 5 generating a route to be followed and/or tracked by the robot 500 of FIG. 5. The dynamic filter 544 of FIG. 5 may be implemented by any type(s) and/or any number(s) of semiconductor device(s) (e.g., microprocessor(s), microcontroller(s), etc.). Data generated, implemented, invoked, processed and/or executed by and/or at the dynamic filter 544 may be of any quantity, type, form and/or format, and may be stored in a computer-readable storage medium such as the example memory 510 of FIG. 5 described below.

The example memory 510 of FIG. 5 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 510 may be stored in any file and/or data structure format, organization scheme, and/or arrangement.

In some examples, the memory 510 stores depth image data captured by the depth camera 502 of FIG. 5. In some examples, the memory 510 stores pose data (e.g., orientation data and associated location data) sensed, measured and/or detected by the odometry sensor 504 of FIG. 5. In some examples, the memory 510 stores control data (e.g., control signal(s), command(s), instruction(s), etc.) generated, implemented, invoked, processed and/or executed by and/or at the controller 508 of FIG. 5. In some examples, the memory 510 stores map data generated, implemented, invoked, processed and/or executed by and/or at the map builder 516 and/or the controller 508 of FIG. 5, including data generated, implemented, invoked, processed and/or executed by and/or at the image manager 520, the pose identifier 522, the target identifier 524, the occupied space identifier 526, the free space developer 528, the graph generator 530, the path generator 532, and/or the map generator 534 of FIG. 5. In some examples, the memory 510 stores route data generated, implemented, invoked, processed and/or executed by and/or at the route builder 518 and/or the controller 508 of FIG. 5, including data generated, implemented, invoked, processed and/or executed by and/or at the field of view evaluator 536, the orientation manager 538, the candidate evaluator 540, the route generator 542, and the dynamic filter 544 of FIG. 5.

The memory 510 of FIG. 5 is accessible to the example depth camera 502, the example odometry sensor 504, the user interface 506 (including the input device(s) 512 and the output device(s) 514), and/or the controller 508 (including the map builder 516, the route builder 518, the image manager 520, the pose identifier 522, the target identifier 524, the occupied space identifier 526, the free space developer 528, the graph generator 530, the path generator 532, the map generator 534, the field of view evaluator 536, the orientation manager 538, the candidate evaluator 540, the route generator 542, and the dynamic filter 544) of FIG. 5, and/or, more generally, to the robot 500 of FIG. 5.

The depth camera 502 of FIG. 5 described above is a means to capture depth images. The odometry sensor 504 of FIG. 5 described above is a means to sense, measure and/or detect data associated with a pose (e.g., an orientation and an associated location) of the robot 500 of FIG. 5. The image manager 520 of FIG. 5 described above is a means to control the operation of the depth camera 502 of FIG. 5. The pose identifier 522 of FIG. 5 described above is a means to identify and/or determine a pose (e.g., an orientation and an associated location) of the robot 500 of FIG. 5 that is associated and/or correlated with a depth image captured via the depth camera 502 of FIG. 5. The target identifier 524 of FIG. 5 described above is a means to identify and/or determine a target location (e.g., a destination location) associated with the robot 500 of FIG. 5. The occupied space identifier 526 of FIG. 5 described above is a means to identify and/or determine the location(s) of one or more occupied space(s) associated with depth images captured by the depth camera 502 of FIG. 5. The free space developer 528 of FIG. 5 described above is a means to construct, build and/or develop a free space network corresponding to and/or representing unoccupied space (e.g., free space) into which the robot 500 of FIG. 5 can freely move without the occurrence of a collision. The graph generator 530 of FIG. 5 described above is a means to generate a graph representing the free space network (e.g., a graph of the free space) developed by the free space developer 528 of FIG. 5. The path generator 532 of FIG. 5 described above is a means to generate one or more path(s) within the free space network developed by the free space developer 528 of FIG. 5. The map generator 534 of FIG. 5 described above is a means to generate a map representing the free space network (e.g., a map of the free space) developed by the free space developer 528 of FIG. 5.

The field of view evaluator 536 of FIG. 5 described above is a means to identify and/or determine the field of view of the depth camera 502 of FIG. 5. The field of view evaluator 536 of FIG. 5 is also a means to identify and/or determine the value of a size attribute (e.g., a width, a height, a depth, etc.) of the field of view, and to identify and/or determine whether the value of the size attribute satisfies a size attribute threshold. The field of view evaluator 536 of FIG. 5 is also a means to identify and/or determine whether the target location (e.g., the destination location) of the robot 500 of FIG. 5 is within the field of view of the depth camera 502 of FIG. 5. The orientation manager 538 of FIG. 5 described above is a means to modify (e.g., rotate) the orientation of the robot 500 of FIG. 5 relative to a reference orientation. The candidate evaluator 540 of FIG. 5 described above is a means to identify and/or determine one or more candidate location(s) located within the field of view of the depth camera 502 of FIG. 5, and/or to identify and/or determine a preferred candidate location from among the candidate location(s). The route generator 542 of FIG. 5 described above is a means to generate a route to be followed and/or tracked by the robot 500 of FIG. 5 from a reference location to either a preferred candidate location or a target location. The dynamic filter 544 described above is a means to convert the route generated by the route generator 542 of FIG. 5 into a dynamically-feasible route that maintains a given bounded error as the robot 500 of FIG. 5 navigates (e.g., along waypoints) from the reference location to either the candidate location or the target location.

While an example manner of implementing the robot 500 is illustrated in FIG. 5, one or more of the elements, processes and/or devices illustrated in FIG. 5 may be combined, divided, re-arranged, omitted, eliminated and/or implemented in any other way. Further, the example depth camera 502, the example odometry sensor 504, the example user interface 506, the example controller 508, the example memory 510, the example input device(s) 512, the example output device(s) 514, the example map builder 516, the example route builder 518, the example image manager 520, the example pose identifier 522, the example target identifier 524, the example occupied space identifier 526, the example free space developer 528, the example graph generator 530, the example path generator 532, the example map generator 534, the example field of view evaluator 536, the example orientation manager 538, the example candidate evaluator 540, the example route generator 542, the example dynamic filter 544 and/or, more generally, the example robot 500 of FIG. 5 may be implemented by hardware, software, firmware and/or any combination of hardware, software and/or firmware. Thus, for example, any of the example depth camera 502, the example odometry sensor 504, the example user interface 506, the example controller 508, the example memory 510, the example input device(s) 512, the example output device(s) 514, the example map builder 516, the example route builder 518, the example image manager 520, the example pose identifier 522, the example target identifier 524, the example occupied space identifier 526, the example free space developer 528, the example graph generator 530, the example path generator 532, the example map generator 534, the example field of view evaluator 536, the example orientation manager 538, the example candidate evaluator 540, the example route generator 542, the example dynamic filter 544 and/or, more generally, the example robot 500 of FIG. 5 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example depth camera 502, the example odometry sensor 504, the example user interface 506, the example controller 508, the example memory 510, the example input device(s) 512, the example output device(s) 514, the example map builder 516, the example route builder 518, the example image manager 520, the example pose identifier 522, the example target identifier 524, the example occupied space identifier 526, the example free space developer 528, the example map generator 534, the example graph generator 530, the example path generator 532, the example field of view evaluator 536, the example orientation manager 538, the example candidate evaluator 540, the example route generator 542, and/or the example dynamic filter 544 of FIG. 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example depth camera 502, the example odometry sensor 504, the example user interface 506, the example controller 508, the example memory 510, the example input device(s) 512, the example output device(s) 514, the example map builder 516, the example route builder 518, the example image manager 520, the example pose identifier 522, the example target identifier 524, the example occupied space identifier 526, the example free space developer 528, the example graph generator 530, the example path generator 532, the example map generator 534 the example field of view evaluator 536, the example orientation manager 538, the example candidate evaluator 540, the example route generator 542, the example dynamic filter 544 and/or, more generally, the example robot 500 of FIG. 5 may include one or more element(s), process(es) and/or device(s) in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the robot 500 of FIG. 5 are shown in FIGS. 13, 14, 15A, 15B, 16 and 17. The machine readable instructions may be one or more executable program(s) or portion(s) of executable program(s) for execution by a computer processor such as the processor (e.g., implemented as the example controller 508 of FIG. 5) shown in the example processor platform 1800 discussed below in connection with FIG. 18. The program(s) may be embodied in software stored on a non-transitory computer readable storage medium such as a CD-ROM, a floppy disk, a hard drive, a DVD, a Blu-ray disk, or a memory associated with the processor and/or controller 508, but the entire program(s) and/or parts thereof could alternatively be executed by a device other than the processor and/or controller 508 and/or embodied in firmware or dedicated hardware. Further, although the example program(s) is/are described with reference to the flowcharts illustrated in FIGS. 13, 14, 15A, 15B, 16 and/or 17, many other methods of implementing the example robot 500 of FIG. 5 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage device(s) and/or computing device(s) (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 13, 14, 15A, 15B, 16 and/or 17 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 13:
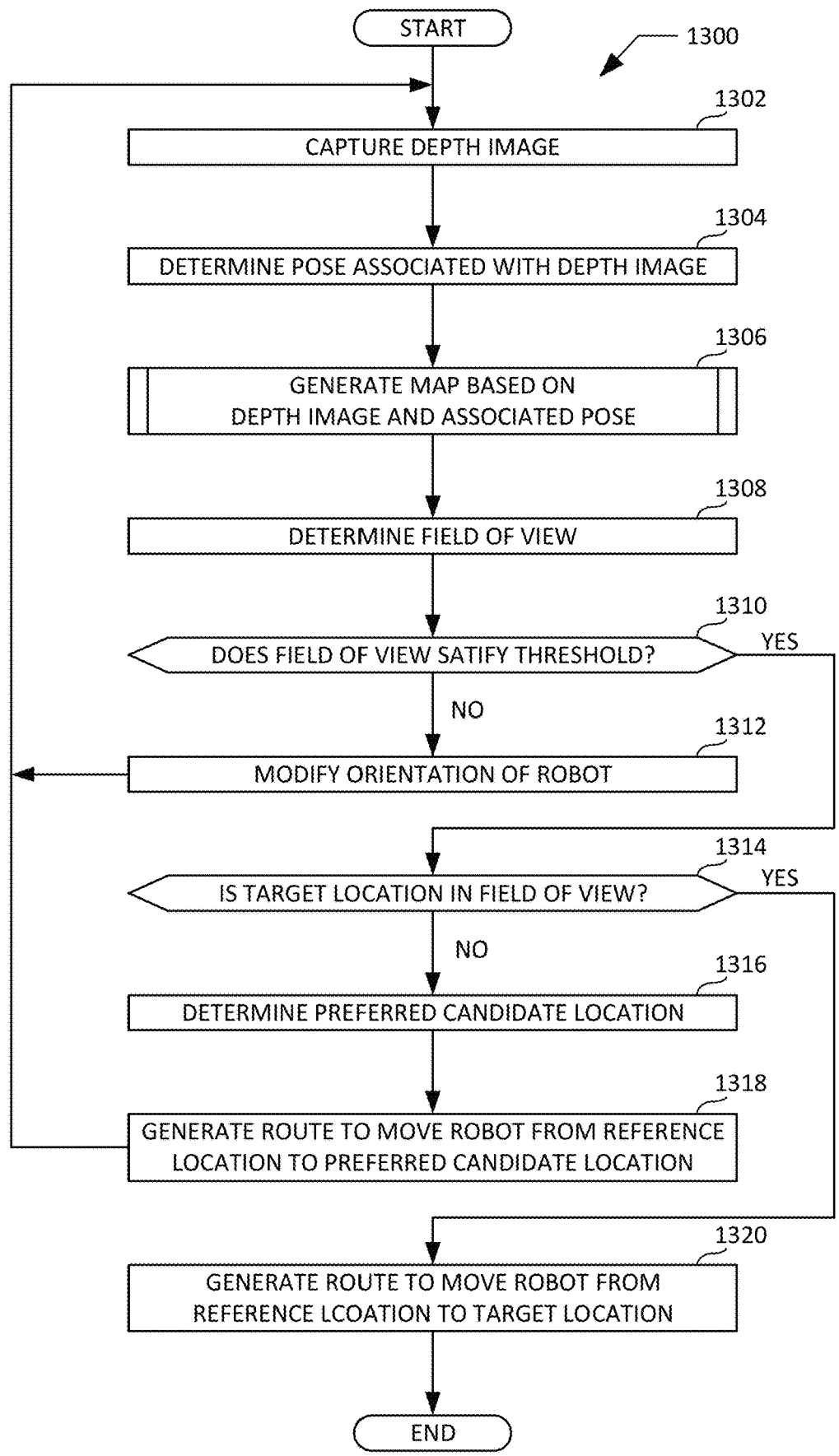
FIG. 13 is a flowchart representative of example machine readable instructions that may be executed to implement the example robot of FIG. 5 to dynamically route the robot based on exploratory on-board mapping.

FIG. 13 is a flowchart representative of example machine readable instructions 1300 that may be executed to implement the example robot 500 of FIG. 5 to dynamically route the robot 500 based on exploratory on-board mapping. The example program 1300 begins when the example depth camera 502 of FIG. 5 captures a depth image (block 1302). For example, the depth camera 502 may capture a depth image in response to a signal, command and/or instruction transmitted to the depth camera 502 from the image manager 520 of FIG. 5. Following block 1302, control of the example program 1300 of FIG. 13 proceeds to block 1304.

At block 1304, the example pose identifier 522 of FIG. 5 identifies, detects and/or determines a pose (e.g., an orientation and an associated location) of the robot 500 of FIG. 5 that is associated and/or correlated with the depth image (block 1304). For example, the depth image captured at block 1302 may be timestamped according to the time at which the depth image was captured by the depth camera 502 of FIG. 5, and pose data (e.g., orientation data and associated location data) sensed, measured and/or detected by the odometry sensor 504 of FIG. 5 may be timestamped according to the time(s) at which the pose(s) (e.g., orientation(s) and associated location(s)) corresponding to the pose data was/were sensed, measured and/or detected by the odometry sensor 504. In such an example, the pose identifier 522 of FIG. 5 identifies, detects and/or determines a pose of the robot 500 that is associated and/or correlated with the depth image by identifying a pose having a timestamp that matches (e.g., is the same as, and/or is within a threshold time from) the timestamp of the depth image. Following block 1304, control of the example program 1300 of FIG. 13 proceeds to block 1306.

At block 1306, the example map generator 534 and/or, more generally, the example map builder 516 of FIG. 5 generates a map based on the depth image and the associated pose (block 1306). An example process that may be used to implement block 1306 of the example program 1300 of FIG. 13 is described in greater detail below in connection with FIG. 14. Following block 1306, control of the example program 1300 of FIG. 13 proceeds to block 1308.

At block 1308, the example field of view evaluator 536 of FIG. 5 identifies, detects and/or determines the field of view of the depth camera 502 of the robot 500 of FIG. 5 (block 1308). For example, the field of view evaluator 536 may identify, detect and/or determine the field of view of the depth camera 502 of FIG. 5 based on the depth image captured by the depth camera 502 at block 1302 and the associated pose (e.g., the orientation and the associated location) identified by the pose identifier 522 of FIG. 5 at block 1304. The field of view evaluator 536 may additionally or alternatively identify, detect and/or determine the field of view of depth camera 502 based on the map generated and/or managed by the map builder 516 of FIG. 5. For example, the field of view evaluator 536 may identify, detect and/or determine the field of view of the depth camera 502 based on the occupied space(s) identified by the occupied space identifier 526, the free space network developed by the free space developer 528, the graph generated by the graph generator 530, the path(s) generated by the path generator 532, and/or the map generated by the map generator 534 of the map builder 516 of FIG. 5. Following block 1308, control of the example program 1300 of FIG. 13 proceeds to block 1310.

At block 1310, the example field of view evaluator 536 of FIG. 5 identifies, detects and/or determines the value of a size attribute (e.g., a width, a height, a depth, etc.) of the field of view, and further identifies, detects and/or determines whether the value of the size attribute satisfies a size attribute threshold (block 1310). For example, the field of view evaluator 536 may identify, detect and or determine whether a depth of the field of view falls below a depth threshold. As another example, the field of view evaluator 536 may identify, detect and/or determine whether a width of the field of view falls below a width threshold. A violation of the size attribute threshold (e.g., a failure to satisfy the size attribute threshold) indicates that the depth camera 502 and/or, more generally, the robot 500 of FIG. 5 is/are at risk of colliding with a structure and/or an obstacle located within the field of view of the depth camera 502. If the field of view evaluator 536 determines at block 1310 that the value of the size attribute does not satisfy the size attribute threshold, control of the example program 1300 of FIG. 13 proceeds to block 1312. If the field of view evaluator 536 instead determines at block 1310 that the value of the size attribute satisfies the size attribute threshold, control of the example program 1300 of FIG. 13 proceeds to block 1314.

At block 1312, the example orientation manager 538 of FIG. 5 signals, commands and/or instructs one or more motor(s) and/or motive component(s) (e.g., rotor(s), wheel(s), track(s), etc.) of the robot 500 of FIG. 5 to operate in a manner that modifies (e.g., rotates) the orientation of the robot 500 relative to a reference orientation (block 1312). Following block 1312, control of the example program 1300 of FIG. 13 returns to block 1302.

At block 1314, the example field of view evaluator 536 of FIG. 5 identifies, detects and/or determines whether the target location (e.g., the destination location) of the robot 500 of FIG. 5 is within the field of view (block 1314). For example, the field of view evaluator 536 may identify, detect and/or determine whether the target location of the robot 500 is within the field of view based on the identification of the target location provided by the target identifier 524 of FIG. 5, and/or based on the path(s) generated by the path generator 532 of FIG. 5 and included on the map generated by the map generator 534 and/or the map builder 516 of FIG. 5. An absence of the target location from the field of view indicates that the robot 500 must be routed to a candidate location (e.g., an intermediate location) within the field of view before the robot 500 can be routed to the target location (e.g., the destination location). If the field of view evaluator 536 determines at block 1314 that the target location is not within the field of view, control of the example program 1300 of FIG. 13 proceeds to block 1316. If the field of view evaluator 536 instead determines at block 1314 that the target location is within the field of view, control of the example program 1300 of FIG. 13 proceeds to block 1320.

At block 1316, the example candidate evaluator 540 of FIG. 5 identifies, detects and/or determines one or more candidate location(s) located within the field of view, and further identifies, detects and/or determines a preferred candidate location from among the candidate location(s) (block 1316). For example, the candidate evaluator 540 may identify, detect and/or determine one or more candidate location(s) located within the field of view by translating the path generated by the path generator 532 of FIG. 5 and/or included in the map generated by the map generator 534 and/or the map builder 516 of FIG. 5 into one or more candidate location(s) located within the field of view. The candidate evaluator 540 may identify, detect and/or determine the proximity of each candidate location within the field of view of the depth camera 502 of the robot 500 relative to the target location of the robot 500 identified, detected and/or determined by the target identifier 524 of FIG. 5 and/or included on the map generated by the map generator 534 of FIG. 5. The candidate evaluator 540 may identify, detect and/or identify the candidate location that is determined to be closest (e.g., most proximate) to the target location of the robot 500 as the preferred candidate location. Following block 1316, control of the example program 1300 of FIG. 13 proceeds to block 1318.

At block 1318, the example route generator 542 of FIG. 5 generates a route to move the robot 500 of FIG. 5 from a reference location to the preferred candidate location (block 1318). For example, the route generator 542 may generate a route from a reference location (e.g., a current location) identified, detected and/or determined by the pose identifier 522 of FIG. 5 to the preferred candidate location (e.g., an intermediate location) identified, detected and/or determined by the candidate evaluator 540 of FIG. 5. In some examples, the dynamic filter 544 of FIG. 5 converts the route generated at block 1318 by the route generator 542 into a dynamically-feasible route that maintains a given bounded error as the robot 500 navigates from the reference location to the preferred candidate location. The route builder 518 of FIG. 5 signals, commands and/or instructs one or more motor(s) and/or motive component(s) (e.g., rotor(s), wheel(s), track(s), etc.) of the robot 500 of FIG. 5 to operate in a manner that moves the robot 500 such that the robot 500 tracks and/or follows the route generated at block 1318 by the route generator 542 and/or the dynamic filter 544 of FIG. 5. Following block 1318, control of the example program 1300 of FIG. 13 returns to block 1302.

At block 1320, the example the example route generator 542 of FIG. 5 generates a route to move the robot 500 of FIG. 5 from a reference location to the target location (block 1320). For example, the route generator 542 may generate a route from a reference location (e.g., a current location) identified, detected and/or determined by the pose identifier 522 of FIG. 5 to the target location (e.g., a destination location) identified, detected and/or determined by the target identifier 524 of FIG. 5. In some examples, the dynamic filter 544 of FIG. 5 converts the route generated at block 1320 by the route generator 542 into a dynamically-feasible route that maintains a given bounded error as the robot 500 navigates from the reference location to the target location. The route builder 518 of FIG. 5 signals, commands and/or instructs one or more motor(s) and/or motive component(s) (e.g., rotor(s), wheel(s), track(s), etc.) of the robot 500 of FIG. 5 to operate in a manner that moves the robot 500 such that the robot 500 tracks and/or follows the route generated at block 1320 by the route generator 542 and/or the dynamic filter 544 of FIG. 5. Following block 1320, the example program 1300 of FIG. 13 ends.

Figure 14:
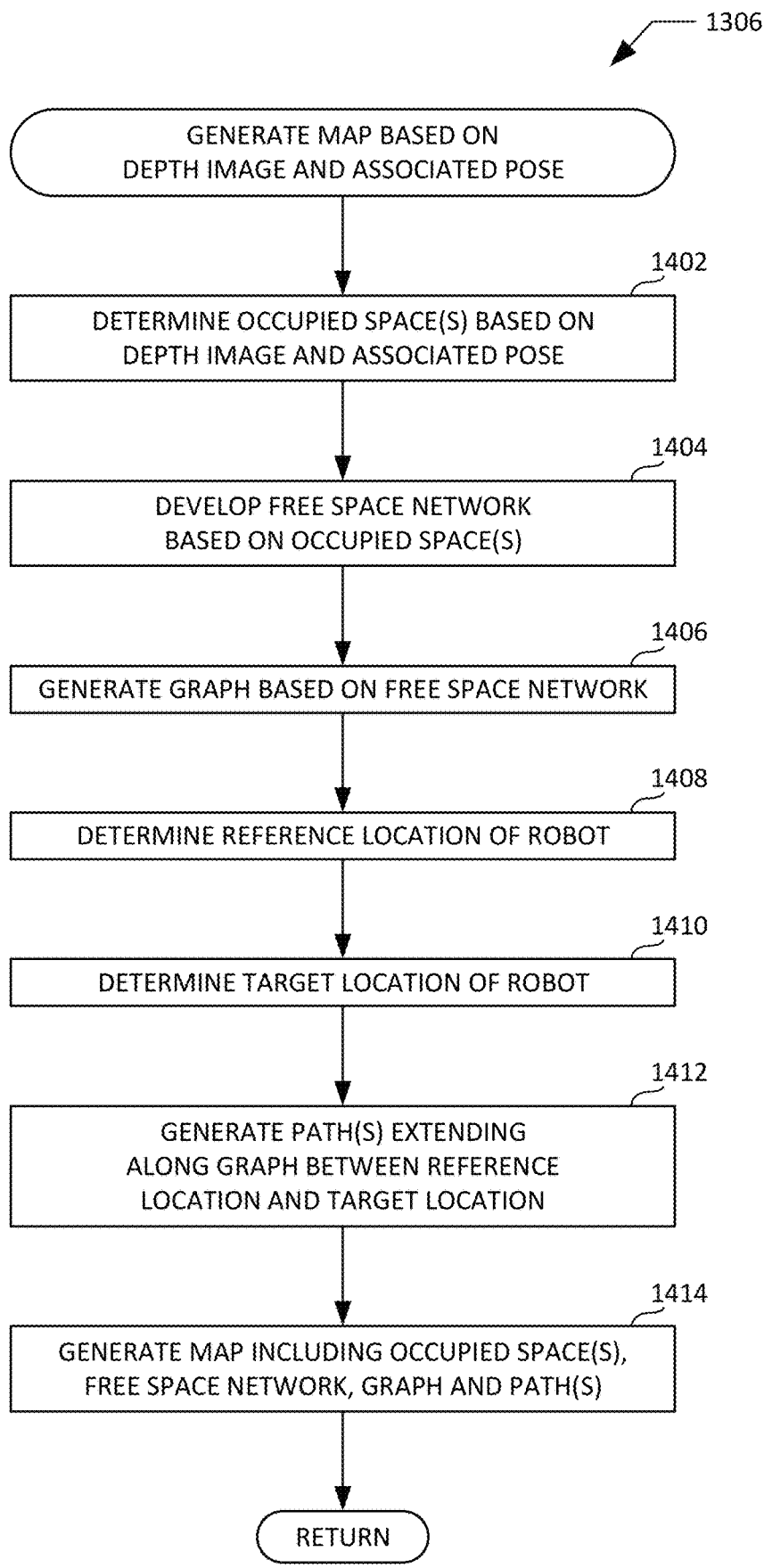
FIG. 14 is a flowchart representative of example machine readable instructions that may be executed to implement the example robot of FIG. 5 to generate a map.

FIG. 14 is a flowchart representative of example machine readable instructions that may be executed to implement the example robot of FIG. 5 to generate a map. Example operations of blocks 1402, 1404, 1406, 1408, 1410, 1412 and 1414 of FIG. 14 may be used to implement block 1306 of FIG. 13. The example program 1306 of FIG. 14 begins when the example occupied space identifier 526 of FIG. 5 identifies, detects and/or determines the location(s) of one or more occupied space(s) associated with a depth image captured by the depth camera 502 of FIG. 5 (block 1402). In some examples, the occupied space identifier 526 identifies, detects and/or determines the location(s) of the occupied space(s) by measuring, analyzing and/or evaluating a depth image for disparities with regard to the relative intensities of the pixels included within the depth image. For example, the occupied space identifier 526 may identify, detect and/or determine the location(s) of one or more darker-colored pixel(s) (e.g., as determined based on pixel intensity disparity measurements relative to one or more lighter-colored pixel(s)) within the depth image that represent one or more occupied space(s). The occupied space identifier 526 of FIG. 5 associates the identified and/or determined location(s) of the occupied space(s) for a depth image with the pose (e.g., the orientation and the associated location) of the robot 500 of FIG. 5 corresponding to the depth image, as identified and/or determined at block 1304 via the pose identifier 522 of FIG. 5. Following block 1402, control of the example program 1306 of FIG. 14 proceeds to block 1404.

At block 1404, the example free space developer 528 of FIG. 5 constructs, builds and/or develops a free space network corresponding to and/or representing unoccupied space (e.g., free space) into which the robot 500 of FIG. 5 can freely move without the occurrence of a collision (block 1404). In some examples, the free space developer 528 constructs, builds and/or develops the free space network based on the occupied space(s) identified and/or determined via the occupied space identifier 526 of FIG. 5. For example, the free space developer 528 may construct, build and/or develop the free space network by deducing the location(s) of one or more unoccupied space(s) in the depth images based on the identified and/or determined location(s) of the occupied space(s) of the depth images. In some examples, the free space developer 528 of FIG. 5 constructs, builds and/or develops the free space network by discretizing the unoccupied space(s) into a plurality of voxels. The voxels may be based on and/or defined by corresponding ones of the pixels from the depth images that fill the unoccupied space(s). In some examples, the free space developer 528 of FIG. 5 assigns nodes to the center points of respective ones of the voxels. Following block 1404, control of the example program 1306 of FIG. 14 proceeds to block 1406.

At block 1406, the example graph generator 530 of FIG. 5 generates a graph representing the free space network developed by the free space developer 528 of FIG. 5 (block 1406). In some examples, the graph generator 530 generates the graph by connecting (e.g., logically connecting, visually connecting, etc.) respective ones of the voxel nodes of the free space network to neighboring ones of the voxel nodes of the free space network. The graph generated by the graph generator 530 of FIG. 5 provides a framework for defining and/or generating one or more path(s) within the free space network. In some examples, the graph defines a collection of candidate paths along which the robot 500 of FIG. 5 can be freely moved without the occurrence of a collision. Following block 1406, control of the example program 1306 of FIG. 14 proceeds to block 1408.

At block 1408, the example pose identifier 522 of FIG. 5 identifies, detects and/or determines a reference location of the robot 500 of FIG. 5 (block 1408). For example, the pose identifier 522 of FIG. 5 may identify, detect and/or determine a reference location (e.g., a current location) of the robot 500 based on the pose associated with the depth image, as identified, detected and/or determined at block 1304 by the pose identifier 522. Following block 1408, control of the example program 1306 of FIG. 14 proceeds to block 1410.

At block 1410, the example target identifier 524 of FIG. 5 identifies, detects and/or determines a target location (e.g., a destination location) associated with the robot 500 of FIG. 5 (block 1410). In some examples, the target identifier 524 identifies, detects and/or determines the target location associated with the robot 500 based on target location data provided to the robot 500 via the input device(s) 512 of the user interface 506 of FIG. 5. In other examples, the target identifier 524 identifies, detects and/or determines the target location associated with the robot 500 based on preprogrammed target location data that is stored in the memory 510 of the robot 500. Following block 1410, control of the example program 1306 of FIG. 14 proceeds to block 1412.

At block 1412, the example path generator 532 of FIG. 5 generates one or more path(s) within the free space network developed by the free space developer 528 of FIG. 5 (block 1412). In some examples, the path(s) generated by the path generator 532 follow(s), track(s) and/or extend(s) along portions of the graph generated at block 1406 by the graph generator 530 of FIG. 5. For example, the path generator 532 may generate one or more path(s) that follow(s), track(s) and/or extend(s) along various ones of the voxel node connections represented by the graph, from a reference location (e.g., a current location) of the robot 500 of FIG. 5 (e.g., as sensed, measured and/or detected by the odometry sensor 504 of FIG. 5 and/or identified, detected and/or determined by the pose identifier 522 of FIG. 5) to the target location of the robot 500 of FIG. 5 (as identified, detected and/or determined by the target identifier 524 of FIG. 5). In some examples, the path generator 532 of FIG. 5 generates a path within the free space network that is determined (e.g., determined by the path generator 532) to be the shortest path between the reference location of the robot 500 and the target location of the robot 500 that follows, tracks and/or extends along various ones of the voxel node connections represented by the graph. Following block 1412, control of the example program 1306 of FIG. 14 proceeds to block 1414.

At block 1414, the example map generator 534 of FIG. 5 generates a map representing the free space network (e.g., a map of the free space) developed at block 1404 by the free space developer 528 of FIG. 5 (block 1414). In some examples, the map generated by the map generator 534 is structured, configured and/or presented as a hierarchical representation (e.g., a logical and/or visual hierarchical representation) of the unoccupied space (e.g., free space) that surrounds the robot 500 of FIG. 5, and/or into which the robot 500 can be freely moved without the occurrence of a collision. In some examples, the map generated by the map generator 534 includes a representation (e.g., a logical and/or visual representation) of the occupied space(s) identified, detected and/or determined at block 1402 by the occupied space identifier 526 of FIG. 5. In some examples, the map generated by the map generator 534 includes a representation (e.g., a logical and/or visual representation) of the graph generated at block 1406 by the graph generator 530 of FIG. 5. In some examples, the map generated by the map generator 534 includes a representation (e.g., a logical and/or visual representation) of the path(s) generated at block 1412 by the path generator 532 of FIG. 5. Following block 1414, control of the example program 1306 of FIG. 14 returns to a function call such as block 1306 of the example program 1300 of FIG. 13.

Figure 15A:
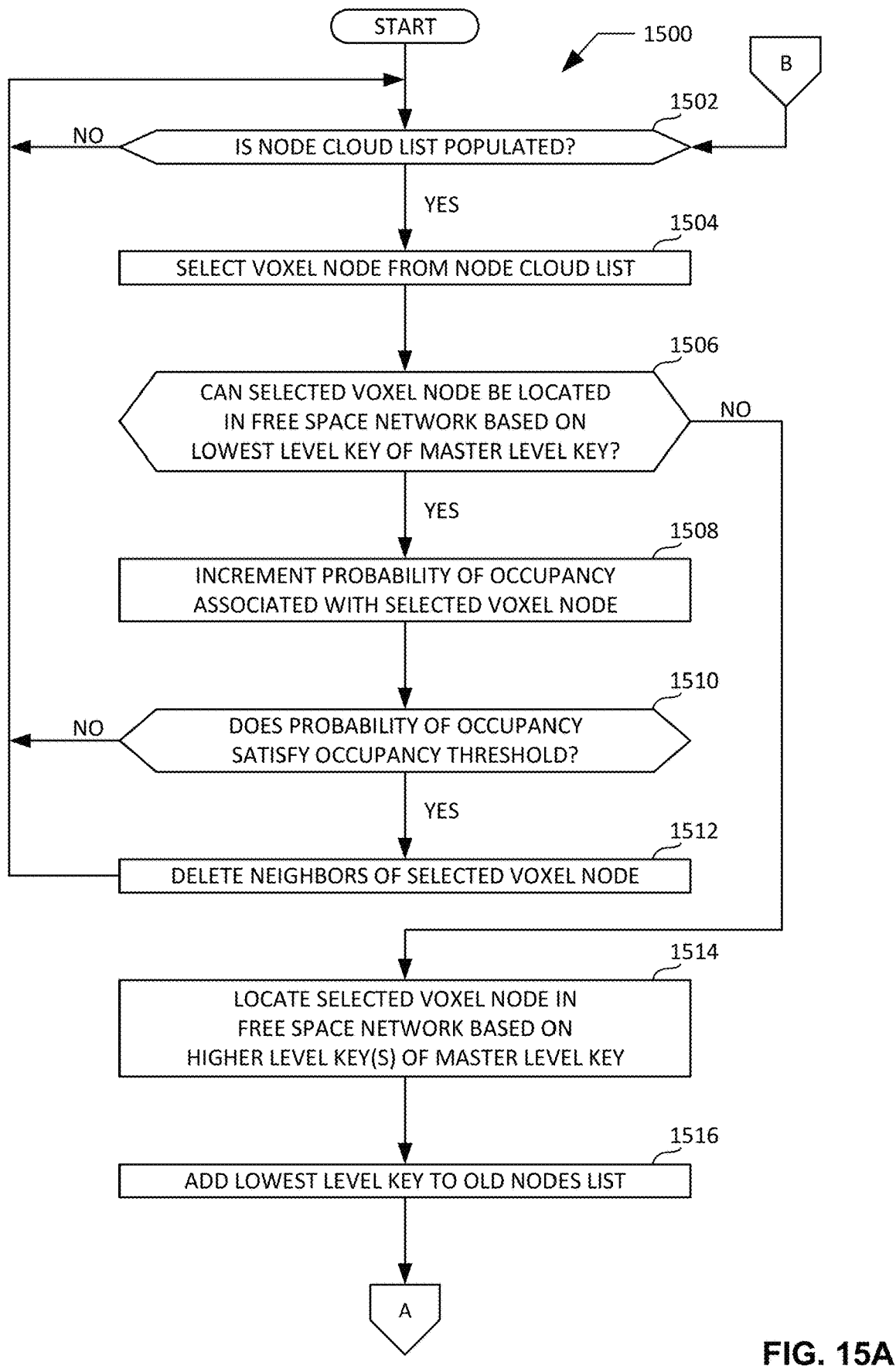
FIGS. 15A and 15B are a flowchart representative of example machine readable instructions that may be executed to implement the example robot of FIG. 5 to develop a free space network.
Figure 15B:
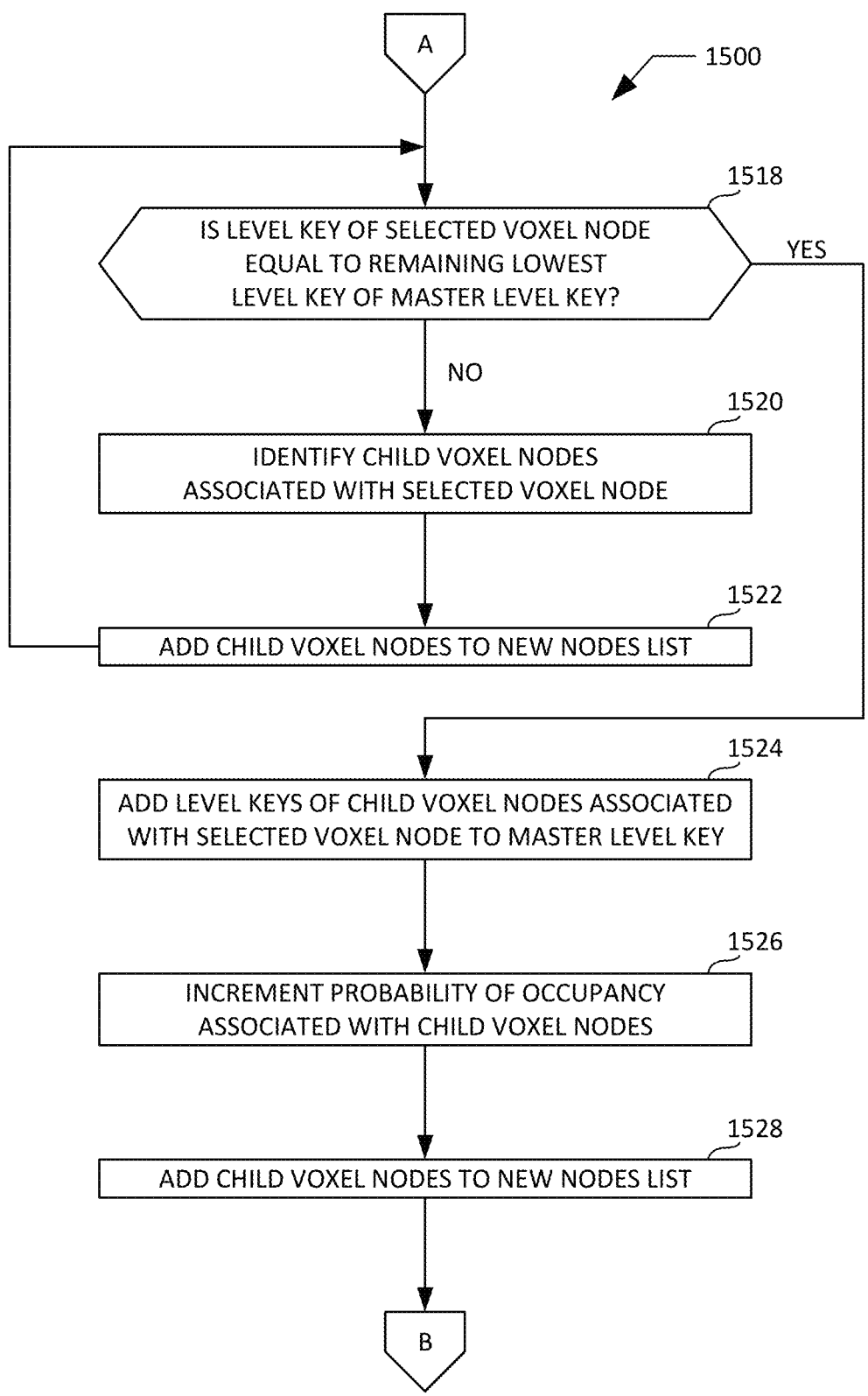

FIGS. 15A and 15B are a flowchart representative of example machine readable instructions 1500 that may be executed to implement the example robot 500 of FIG. 5 to develop a free space network. The example program 1500 begins when the example free space developer 528 of FIG. 5 determines whether a node cloud list maintained by the free space developer 528 is populated (block 1502). For example, the free space developer 528 may determine that the node cloud list is populated with one or more voxel node(s). If the free space developer 528 determines at block 1502 that the node cloud list is not populated, control of the example program 1500 of FIGS. 15A and 15B remains at block 1502. If the free space developer 528 instead determines at block 1502 that the node cloud list is populated, control of the example program 1500 of FIGS. 15A and 15B proceeds to block 1504.

At block 1504, the example free space developer 528 of FIG. 5 selects a voxel node from the node cloud list (block 1504). For example, the free space developer 528 may select a first voxel node from among a plurality of voxel nodes that may be populating the node cloud list. Following block 1504, control of the example program 1500 of FIGS. 15A and 15B proceeds to block 1506.

At block 1506, the example free space developer 528 of FIG. 5 determines whether the selected voxel node can be located in the free space network based on a lowest level key of a master level key associated with the free space network (block 1506). For example, the free space developer 528 may determine that the selected voxel node can be located in the free space network 700 of FIG. 7 based on a lowest level key of the master level key 708 of FIG. 7 associated with the free space network 700. If the free space developer 528 determines at block 1506 that the selected voxel node can be located in the free space network based on the lowest level key of the master key, control of the example program 1500 of FIGS. 15A and 15B proceeds to block 1508. If the free space developer 528 instead determines at block 1506 that the selected voxel node cannot be located in the free space network based on the lowest level key of the master key, control of the example program 1500 of FIGS. 15A and 15B proceeds to block 1514.

At block 1508, the example free space developer 528 of FIG. 5 increments a probability of occupancy associated with the selected voxel node (block 1508). For example, the free space developer 528 may increase the probability of occupancy associated with the selected voxel node from a lower value to a higher value. Following block 1508, control of the example program 1500 of FIGS. 15A and 15B proceeds to block 1510.

At block 1510, the example free space developer 528 of FIG. 5 determines whether the probability of occupancy associated with the selected voxel node satisfies an occupancy threshold (block 1510). For example, the free space developer 528 may determine that the probability of occupancy associated with the selected voxel node satisfies (e.g., exceeds) the occupancy threshold. If the free space developer 528 determines at block 1510 that the probability of occupancy associated with the selected voxel node does not satisfy the occupancy threshold, control of the example program 1500 of FIGS. 15A and 15B returns to block 1502. If the free space developer 528 instead determines at block 1510 that the probability of occupancy associated with the selected voxel node satisfies the occupancy threshold, control of the example program 1500 of FIGS. 15A and 15B proceeds to block 1512.

At block 1512, the example free space developer 528 of FIG. 5 deletes the neighbors associated with the selected voxel node (block 1512). For example, the free space developer 528 may delete one or more voxel node(s) that neighbor (e.g., share a face with) the selected voxel node. Following block 1512, control of the example program 1500 of FIGS. 15A and 15B returns to block 1502.

At block 1514, the example free space developer 528 of FIG. 5 locates the selected voxel node in the free space network based on one or more higher level key(s) of the master level key associated with the free space network (block 1514). For example, the free space developer 528 may locate the selected voxel node in the free space network 700 of FIG. 7 based on a level key of the master level key 708 of FIG. 7 that resides above the lowest level key of the master level key 708. Following block 1514, control of the example program 1500 of FIGS. 15A and 15B proceeds to block 1516.

At block 1516, the example free space developer 528 of FIG. 5 adds the lowest level key to an old nodes list (block 1516). For example, the free space developer 528 may add the lowest level key of the master level key 708 of FIG. 7 to an old nodes list maintained by the free space developer 528. Following block 1516, control of the example program 1500 of FIGS. 15A and 15B proceeds to block 1518.

At block 1518, the example free space developer 528 of FIG. 5 determines whether the level key associated with the selected voxel node is equal to the remaining lowest level key of the master level key (block 1518). If the free space developer 528 determines at block 1518 that the level key associated with the selected voxel node is not equal to the remaining lowest level key of the master level key, control of the example program 1500 of FIGS. 15A and 15B proceeds to block 1520. If the free space developer 528 instead determines at block 1518 that the level key associated with the selected voxel node is equal to the remaining lowest level key of the master level key, control of the example program 1500 of FIGS. 15A and 15B proceeds to block 1524.

At block 1520, the example free space developer 528 of FIG. 5 identifies child voxel nodes that are associated with the selected voxel node (block 1520). For example, the free space developer 528 may identify one or more child voxel node(s) that are associated with the selected voxel node (e.g., a parent voxel node) based on one or more logical connection(s) (e.g., the logical connections 710 of FIG. 7) included in the master level key. Following block 1520, control of the example program 1500 of FIGS. 15A and 15B proceeds to block 1522.

At block 1522, the example free space developer 528 of FIG. 5 adds the child voxel nodes to a new nodes list (block 1522). For example, the free space developer 528 may add the child voxel nodes of the selected voxel node to a new nodes list maintained by the free space developer 528. Following block 1522, control of the example program 1500 of FIGS. 15A and 15B returns to block 1518.

At block 1524, the example free space developer 528 of FIG. 5 adds the child voxel node keys that are associated with the level key of the selected voxel node to the master level key (block 1524). Following block 1524, control of the example program 1500 of FIGS. 15A and 15B proceeds to block 1526.

At block 1526, the example free space developer 528 of FIG. 5 increments a probability of occupancy associated with the child voxel nodes that are associated with the selected voxel node (block 1526). For example, the free space developer 528 may increase the probability of occupancy associated with the child voxel nodes from a lower value to a higher value. Following block 1526, control of the example program 1500 of FIGS. 15A and 15B proceeds to block 1528.

At block 1528, the example free space developer 528 of FIG. 5 adds the child voxel nodes to a new nodes list (block 1528). For example, the free space developer 528 may add the child voxel nodes of the selected voxel node to a new nodes list maintained by the free space developer 528. Following block 1528, control of the example program 1500 of FIGS. 15A and 15B returns to block 1502.

Figure 16:
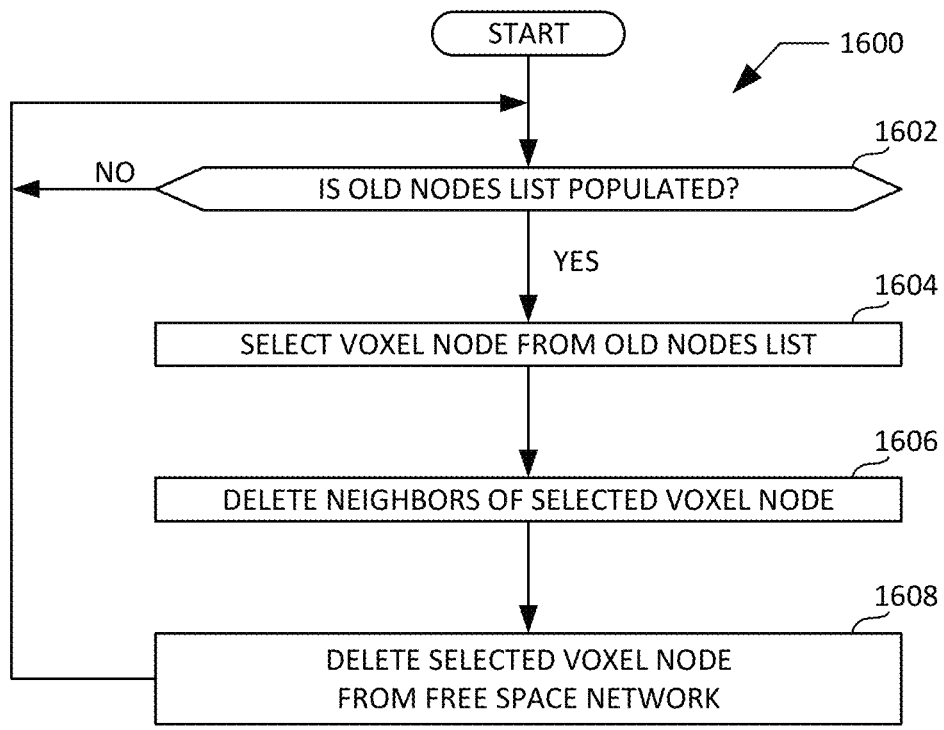
FIG. 16 is a flowchart representative of example machine readable instructions that may be executed to implement the example robot of FIG. 5 to delete voxel nodes from a free space network being developed by the robot.

FIG. 16 is a flowchart representative of example machine readable instructions 1600 that may be executed to implement the example robot 500 of FIG. 5 to delete voxel nodes from a free space network being developed by the robot 500. The example program 1600 begins when the example free space developer 528 of FIG. 5 determines whether an old nodes list maintained by the free space developer 528 is populated (block 1602). For example, the free space developer 528 may determine that the old nodes list is populated with one or more voxel node(s). If the free space developer 528 determines at block 1602 that the old nodes list is not populated, control of the example program 1600 of FIG. 16 remains at block 1602. If the free space developer 528 instead determines at block 1602 that the old nodes list is populated, control of the example program 1600 of FIG. 16 proceeds to block 1604.

At block 1604, the example free space developer 528 of FIG. 5 selects a voxel node from the old nodes list (block 1604). For example, the free space developer 528 may select a first voxel node from among a plurality of voxel nodes that may be populating the old nodes list. Following block 1604, control of the example program 1600 of FIG. 16 proceeds to block 1606.

At block 1606, the example free space developer 528 of FIG. 5 deletes the neighbors associated with the selected voxel node (block 1606). For example, the free space developer 528 may delete one or more voxel node(s) that neighbor (e.g., share a face with) the selected voxel node. Following block 1606, control of the example program 1600 of FIG. 16 proceeds to block 1608.

At block 1608, the example free space developer 528 of FIG. 5 deletes the selected voxel node from the free space network (block 1608). Following block 1608, control of the example program 1600 of FIG. 16 returns to block 1602.

Figure 17:
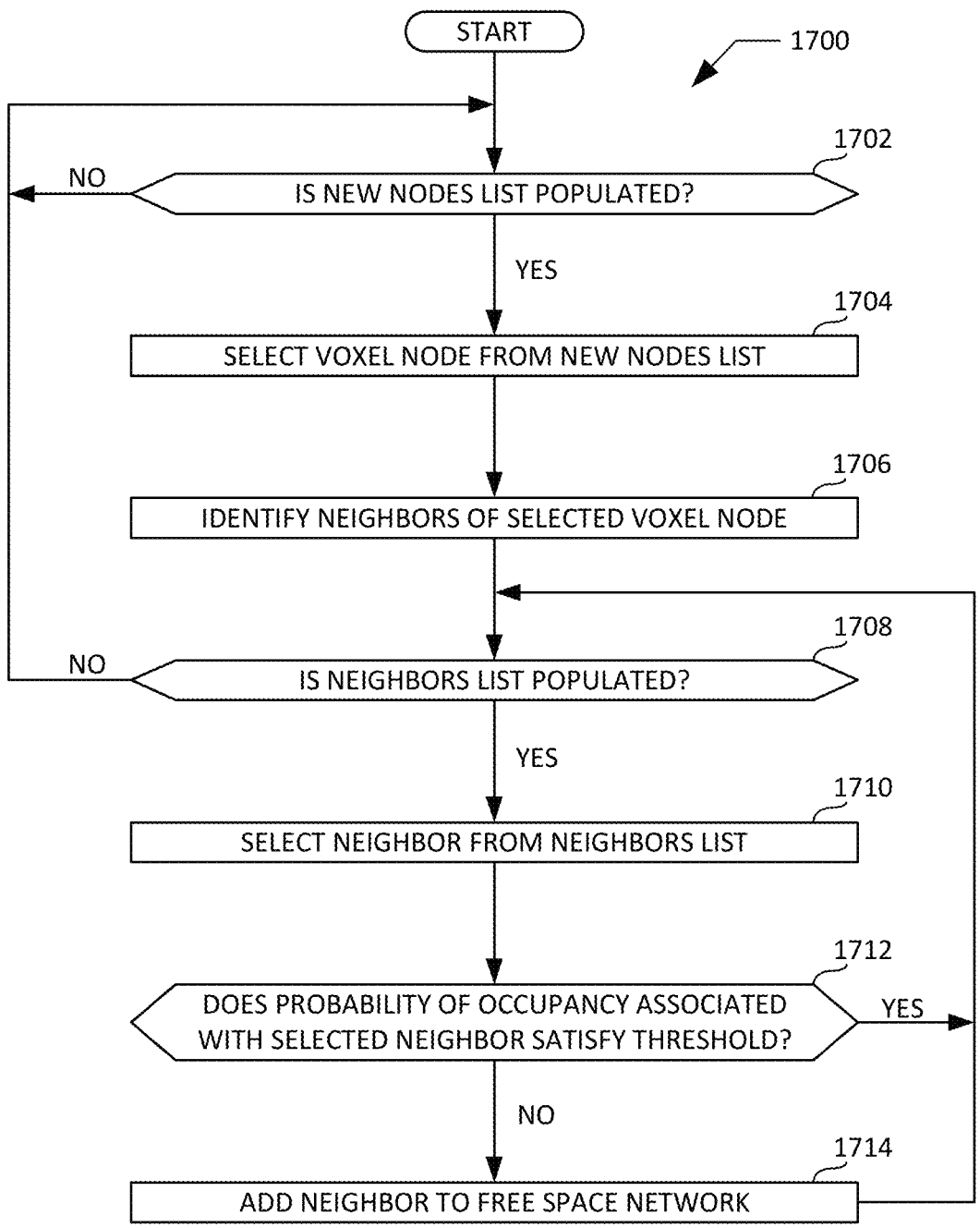
FIG. 17 is a flowchart representative of example machine readable instructions that may be executed to implement the example robot of FIG. 5 to add voxel nodes to a free space network being developed by the robot.

FIG. 17 is a flowchart representative of example machine readable instructions 1700 that may be executed to implement the example robot 500 of FIG. 5 to add voxel nodes to a free space network being developed by the robot 500. The example program 1700 begins when the example free space developer 528 of FIG. 5 determines whether a new nodes list maintained by the free space developer 528 is populated (block 1702). For example, the free space developer 528 may determine that the new nodes list is populated with one or more voxel node(s). If the free space developer 528 determines at block 1702 that the new nodes list is not populated, control of the example program 1700 of FIG. 17 remains at block 1702. If the free space developer 528 instead determines at block 1702 that the old nodes list is populated, control of the example program 1700 of FIG. 17 proceeds to block 1704.

At block 1704, the example free space developer 528 of FIG. 5 selects a voxel node from the new nodes list (block 1704). For example, the free space developer 528 may select a first voxel node from among a plurality of voxel nodes that may be populating the new nodes list. Following block 1704, control of the example program 1700 of FIG. 17 proceeds to block 1706.

At block 1706, the example free space developer 528 of FIG. 5 identifies the neighbors associated with the selected voxel node (block 1706). For example, the free space developer 528 may identify one or more voxel node(s) that neighbor (e.g., share a face with) the selected voxel node. Following block 1706, control of the example program 1700 of FIG. 17 proceeds to block 1708.

At block 1708, the example free space developer 528 of FIG. 5 determines whether a neighbors list maintained by the free space developer 528 is populated (block 1708). For example, the free space developer 528 may determine that the neighbors list is populated with one or more voxel node(s). If the free space developer 528 determines at block 1708 that the neighbors list is not populated, control of the example program 1700 of FIG. 17 returns to block 1702. If the free space developer 528 instead determines at block 1708 that the neighbors list is populated, control of the example program 1700 of FIG. 17 proceeds to block 1710.

At block 1710, the example free space developer 528 of FIG. 5 selects a voxel node from the neighbors list (block 1710). For example, the free space developer 528 may select a first voxel node from among a plurality of voxel nodes that may be populating the neighbors list. Following block 1710, control of the example program 1700 of FIG. 17 proceeds to block 1712.

At block 1712, the example free space developer 528 of FIG. 5 determines whether the probability of occupancy associated with the selected neighbor satisfies an occupancy threshold (block 1712). For example, the free space developer 528 may determine that the probability of occupancy associated with the selected neighbor satisfies (e.g., exceeds) the occupancy threshold. If the free space developer 528 determines at block 1712 that the probability of occupancy associated with the selected neighbor satisfies the occupancy threshold, control of the example program 1700 of FIG. 17 returns to block 1708. If the free space developer 528 instead determines at block 1712 that the probability of occupancy associated with the selected neighbor does not satisfy the occupancy threshold, control of the example program 1700 of FIG. 17 proceeds to block 1714.

At block 1714, the example free space developer 528 of FIG. 5 adds the neighbor to the free space network (block 1714). Following block 1714, control of the example program 1700 of FIG. 17 returns to block 1708.

Figure 18:
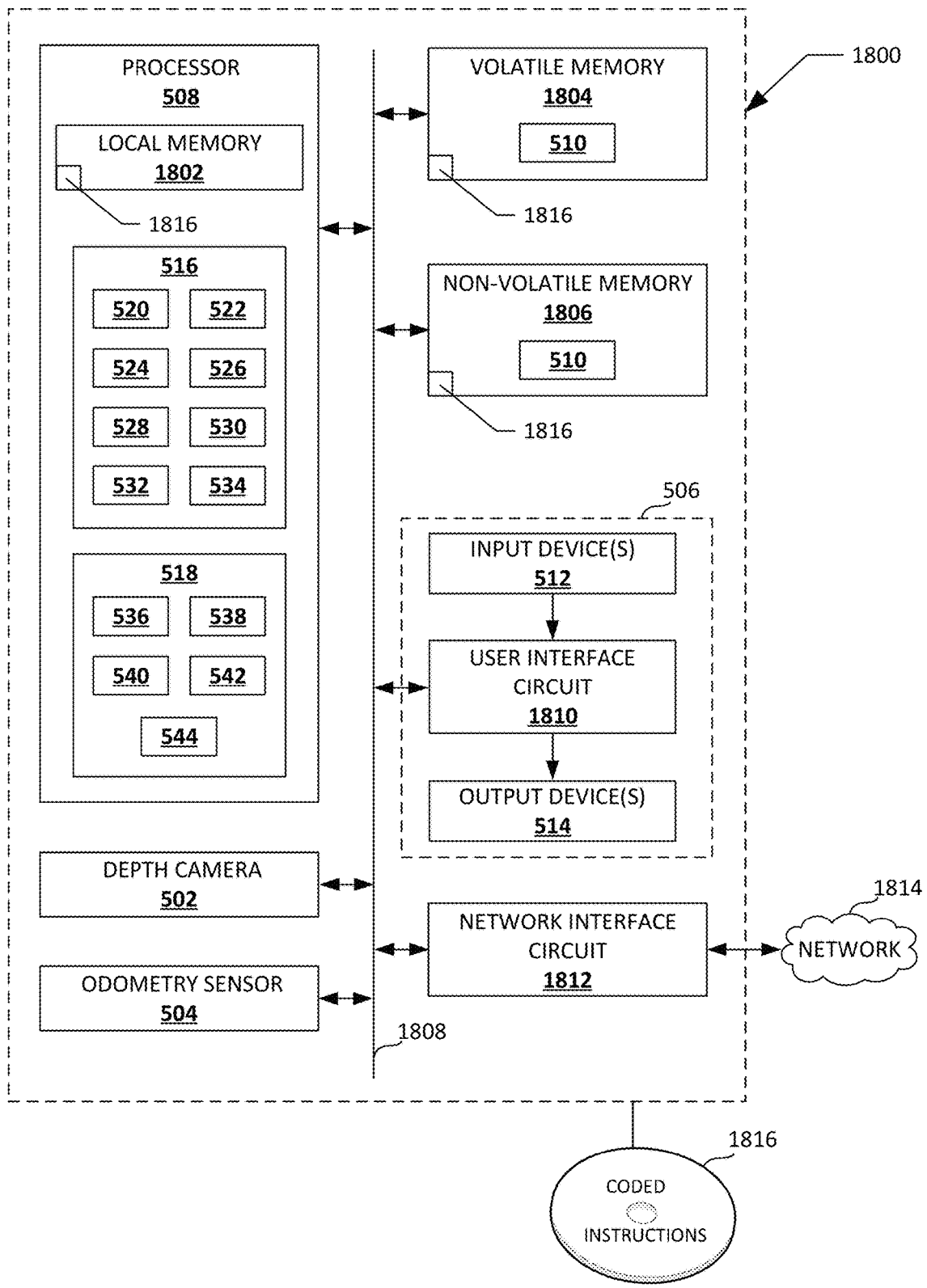
FIG. 18 is a block diagram of an example processor platform structured to execute the example instructions of FIGS. 13, 14, 15A, 15B, 16 and/or 17 to implement the example robot of FIG. 5.

FIG. 18 is a block diagram of an example processor platform 1800 structured to execute the example instructions of FIGS. 13, 14, 15A, 15B, 16 and/or 17 to implement the example robot 500 of FIG. 5. The processor platform 1800 of the illustrated example includes a processor implemented as the example controller 508 of FIG. 5. The controller 508 of the illustrated example is hardware. For example, the controller 508 can be implemented by one or more integrated circuit(s), logic circuit(s), microprocessor(s), GPU(s), DSP(s), or controller(s) from any desired family or manufacturer. The hardware controller may be a semiconductor based (e.g., silicon based) device. In this example, the controller 508 implements the example map builder 516, the example route builder 518, the example image manager 520, the example pose identifier 522, the example target identifier 524, the example occupied space identifier 526, the example free space developer 528, the example graph generator 530, the example path generator 532, the example map generator 534, the example field of view evaluator 536, the example orientation manager 538, the example candidate evaluator 540, the example route generator 542, and the example dynamic filter 544 of FIG. 5.

The controller 508 of the illustrated example includes a local memory 1802 (e.g., a cache). The controller 508 is in communication with a main memory including a volatile memory 1804 and a non-volatile memory 1806 via a bus

1808. The volatile memory 1804 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1806 may be implemented by flash memory and/or any other desired type of memory device. Access to the main memory 1804, 1806 is controlled by a memory controller. In the illustrated example of FIG. 18, one or both of the volatile memory 1804 and/or the non-volatile memory 1806 implement(s) the example memory 510 of FIG. 5. The controller 508 of the illustrated example is also in communication with the example depth camera 502 and the example odometry sensor 504 of FIG. 5 via the bus 1808.

The processor platform 1800 of the illustrated example also includes a user interface circuit 1810. The user interface circuit 1810 may be implemented by any type of interface standard, such as an Ethernet interface, a universal serial bus (USB), a Bluetooth® interface, a near field communication (NFC) interface, and/or a PCI express interface. In the illustrated example, one or more input device(s) 512 are connected to the user interface circuit 1810. The input device(s) 512 permit(s) a user to enter data and/or commands into the controller 508. The input device(s) 512 can be implemented by, for example, an audio sensor, a microphone, a camera (still or video), a keyboard, a button, a mouse, a touchscreen, a track-pad, a trackball, isopoint and/or a voice recognition system. One or more output device(s) 514 are also connected to the user interface circuit 1810 of the illustrated example. The output device(s) 514 can be implemented, for example, by display devices (e.g., a light emitting diode (LED), an organic light emitting diode (OLED), a liquid crystal display (LCD), a touchscreen, etc.), a tactile output device, and/or a speaker. The user interface circuit 1810 of the illustrated example, thus, typically includes a graphics driver card, a graphics driver chip and/or a graphics driver processor. In the illustrated example, the input device(s) 512, the output device(s) 514, and the user interface circuit 1810 collectively implement the example user interface 506 of FIG. 5.

The processor platform 1800 of the illustrated example also includes a network interface circuit 1812. The network interface circuit 1812 may be implemented by any type of interface standard, such as an Ethernet interface, a universal serial bus (USB), a Bluetooth® interface, a near field communication (NFC) interface, and/or a PCI express interface. The network interface circuit 1812 may include a radio transmitter, a radio receiver, and/or a radio transceiver to facilitate the exchange of data and/or signals with external machines (e.g., a server, other drones, etc.) via a network 1814 (e.g., a cellular network, a wireless local area network (WLAN), etc.).

Coded instructions 1816 including the machine executable instructions of FIGS. 13, 14, 15A, 15B, 16 and/or 17 may be stored in the local memory 1802, in the volatile memory 1804, in the non-volatile memory 1806, and/or on a removable non-transitory computer readable storage medium such as a flash memory stick, a CD, or a DVD.

From the foregoing, it will be appreciated that methods and apparatus have been disclosed that implement integrated mapping and routing operations which advantageously enable a robot to be dynamically routed within an environment based on exploratory on-board mapping. Disclosed methods and apparatus are especially advantageous for applications and/or uses that involve navigating a robot in a complex, unknown environment. In some example disclosed methods and apparatus a map is generated of free (e.g., unoccupied) space based on disparity measurements associated with depth images captured by a depth camera of a robot as the robot navigates within an environment. In some examples, the generated map includes topological information that advantageously facilitates the implementation of graphical techniques for finding shortest paths to desired locations and/or unexplored regions within the environment.

In some disclosed examples, a path is translated from the generated map into one or more candidate location(s) within the field of view of the robot into which the robot can freely move without the occurrence of a collision. In connection with navigating the robot toward and/or to a target location within the environment, disclosed methods and apparatus route the robot from its current location to a preferred one of the candidate location(s) (e.g., to the candidate location that is determined to be the closest to the target location) within the environment. Disclosed methods and apparatus may route the robot to the target location in response to the target location appearing within the field of view of the robot.

In some examples, disclosed methods and apparatus implement a dynamic filter to advantageously generate a dynamically-feasible route that maintains a given bounded error from the beginning to the end of the route. Routes generated via the dynamic filter are advantageously configured to succeed (e.g., to be free of collisions) in the presence of model disturbances and environmental uncertainty. By implementing the dynamic filter, disclosed methods and apparatus eliminate the need for solving complex optimization problems in connection with routing the robot, thereby advantageously reducing the processing requirements of the robot.

In some examples, a control system of a robot is disclosed. In some disclosed examples, the control system includes an image manager to command a depth camera to capture depth images of an environment. The depth camera has a field of view. In some disclosed examples, the control system further includes a map generator to generate a map of the environment based on the depth images. The map includes a representation of unoccupied space within the environment, and further includes a path extending through the unoccupied space from a reference location of the robot to a target location of the robot. In some disclosed examples, the control system further includes a field of view evaluator to determine whether the field of view associated with the reference location satisfies a threshold. In some disclosed examples, the control system further includes a route generator to generate, in response to the field of view associated with the reference location satisfying the threshold, a route to be followed by the robot within the environment. The route includes a first candidate location located along the path of the map between the reference location and the target location. The first candidate location is within the field of view associated with the reference location.

In some disclosed examples, the field of view evaluator is to determine whether the target location is within the field of view associated with the reference location. In some disclosed examples, the route generator is to generate the route in response to the target location not being within the field of view associated with the reference location.

In some disclosed examples, the control system further includes an orientation manager to modify an orientation of the robot in response to the field of view not satisfying the threshold.

In some disclosed examples, the control system includes a dynamic filter to convert the route into a dynamic route having a bounded error. The bounded error is based on a dynamic constraint of the robot. In some disclosed examples, the dynamic filter includes an array of low pass filters. In some disclosed examples, the dynamic constraint is at least one of a maximum position error, a maximum velocity, a maximum acceleration, or a maximum jerk.

In some disclosed examples, the control system further includes an occupied space identifier to determine occupied space within the environment based on the depth images.

In some disclosed examples, the control system further includes a free space developer to construct the unoccupied space of the map based on the occupied space determined by the occupied space identifier. The free space developer is to discretize the unoccupied space into voxels. The voxels have voxel nodes corresponding to the center points of the voxels. The voxel nodes represent candidate locations for the robot.

In some disclosed examples, the control system further includes a graph generator to generate a graph of the unoccupied space. The graph includes connections between neighboring ones of the voxel nodes.

In some disclosed examples, the control system further includes a path generator to generate the path. The path is along a plurality of the connections of the graph and through a first subset of the candidate locations. The first subset includes a second subset of the candidate locations. The candidate locations of the second subset are located within the field of view associated with the reference location and include the first candidate location. The first candidate location is located closest to the target location from among the candidate locations of the second subset.

In some examples, a non-transitory computer-readable storage medium comprising instructions is disclosed. In some disclosed examples, the instructions, when executed, cause one or more processors of a robot to command a depth camera of the robot to capture depth images of an environment. The depth camera has a field of view. In some disclosed examples, the instructions, when executed, cause the one or more processors to generate a map of the environment based on the depth images. The map includes a representation of unoccupied space within the environment, and further includes a path extending through the unoccupied space from a reference location of the robot to a target location of the robot. In some disclosed examples, the instructions, when executed, cause the one or more processors to determine whether the field of view associated with the reference location satisfies a threshold. In some disclosed examples, the instructions, when executed, cause the one or more processors to generate, in response to the field of view associated with the reference location satisfying the threshold, a route to be followed by the robot within the environment. The route includes a first candidate location located along the path of the map between the reference location and the target location. The first candidate location is within the field of view associated with the reference location.

In some disclosed examples, the instructions, when executed, cause the one or more processors to determine whether the target location is within the field of view associated with the reference location. In some disclosed examples, the instructions, when executed, cause the one or more processors to generate the route in response to the target location not being within the field of view associated with the reference location.

In some disclosed examples, the instructions, when executed, cause the one or more processors to modify an orientation of the robot in response to the field of view not satisfying the threshold.

In some disclosed examples, the instructions, when executed, cause the one or more processors to convert the route into a dynamic route having a bounded error. The bounded error is based on a dynamic constraint of the robot. In some disclosed examples, the dynamic constraint is at least one of a maximum position error, a maximum velocity, a maximum acceleration, or a maximum jerk.

In some disclosed examples, the instructions, when executed, cause the one or more processors to generate the map by determining occupied space within the environment based on the depth images.

In some disclosed examples, the instructions, when executed, cause the one or more processors to generate the map by constructing the unoccupied space of the map based on the determined occupied space. The constructing of the unoccupied space includes discretizing the unoccupied space into voxels. The voxels have voxel nodes corresponding to the center points of the voxels. The voxel nodes represent candidate locations for the robot.

In some disclosed examples, the instructions, when executed, cause the one or more processors to generate the map by generating a graph of the unoccupied space. The graph includes connections between neighboring ones of the voxel nodes.

In some disclosed examples, the instructions, when executed, cause the one or more processors to generate the map by generating the path. The path is along a plurality of the connections of the graph and through a first subset of the candidate locations. The first subset includes a second subset of the candidate locations. The candidate locations of the second subset are located within the field of view associated with the reference location and include the first candidate location. The first candidate location is located closest to the target location from among the candidate locations of the second subset.

In some examples, a method is disclosed. In some disclosed examples, the method includes commanding, by executing a computer-readable instruction with one or more processors of a robot, a depth camera of the robot to capture depth images of an environment. The depth camera has a field of view. In some disclosed examples, the method includes generating, by executing a computer-readable instruction with the one or more processors, a map of the environment based on the depth images. The map includes a representation of unoccupied space within the environment, and further includes a path extending through the unoccupied space from a reference location of the robot to a target location of the robot. In some disclosed examples, the method includes determining, by executing a computer-readable instruction with the one or more processors, whether the field of view associated with the reference location satisfies a threshold. In some disclosed examples, the method includes generating, by executing a computer-readable instruction with the one or more processors in response to the field of view associated with the reference location satisfying the threshold, a route to be followed by the robot within the environment. The route includes a first candidate location located along the path of the map between the reference location and the target location. The first candidate location is within the field of view associated with the reference location.

In some disclosed examples, the method further includes determining, by executing a computer-readable instruction with the one or more processors, whether the target location is within the field of view associated with the reference location. In some disclosed examples, the method further includes generating, by executing a computer-readable instruction with the one or more processors in response to the target location not being within the field of view associated with the reference location, the route.

In some disclosed examples, the method further includes modifying, by executing a computer-readable instruction with the one or more processors, an orientation of the robot in response to the field of view not satisfying the threshold.

In some disclosed examples, the method further includes converting, by executing a computer-readable instruction with the one or more processors, the route into a dynamic route having a bounded error. The bounded error is based on a dynamic constraint of the robot. In some disclosed examples, the dynamic constraint is at least one of a maximum position error, a maximum velocity, a maximum acceleration, or a maximum jerk.

In some disclosed examples, the generating of the map includes determining, by executing a computer-readable instruction with the one or more processors, occupied space within the environment based on the depth images.

In some disclosed examples, the generating of the map further includes constructing, by executing a computer-readable instruction with the one or more processors, the unoccupied space of the map based on the determined occupied space. The constructing of the unoccupied space includes discretizing the unoccupied space into voxels. The voxels have voxel nodes corresponding to the center points of the voxels. The voxel nodes represent candidate locations for the robot.

In some disclosed examples, the generating of the map further includes generating, by executing a computer-readable instruction with the one or more processors, a graph of the unoccupied space. The graph includes connections between neighboring ones of the voxel nodes.

In some disclosed examples, the generating of the map further includes generating, by executing a computer-readable instruction with the one or more processors, the path. The path is along a plurality of the connections of the graph and through a first subset of the candidate locations. The first subset includes a second subset of the candidate locations. The candidate locations of the second subset are located within the field of view associated with the reference location and include the first candidate location. The first candidate location is located closest to the target location from among the candidate locations of the second subset.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A control system of a robot, the control system comprising:
    an image manager to command a depth camera to capture depth images of an environment, the depth camera having a field of view;
    a map generator to generate a map of the environment based on the depth images, the map including a representation of unoccupied space within the environment, the map further including a path extending through the unoccupied space from a reference location of the robot to a target location of the robot;
    a field of view evaluator to determine whether a value of a size attribute of the field of view associated with the reference location satisfies a size attribute threshold; and
    a route generator to generate, in response to the value of the size attribute satisfying the size attribute threshold, a route to be followed by the robot within the environment, the route including a first candidate location located along the path of the map between the reference location and the target location, the first candidate location being within the field of view associated with the reference location.

2. The control system as defined in claim 1, wherein:
    the field of view evaluator is to determine whether the target location is within the field of view associated with the reference location; and
    the route generator is to generate the route in response to the value of the size attribute satisfying the size attribute threshold and the target location not being within the field of view associated with the reference location.

3. The control system as defined in claim 1, further including an orientation manager to modify an orientation of the robot in response to the value of the size attribute not satisfying the size attribute threshold.

4. The control system as defined in claim 1, further including a dynamic filter to convert the route into a dynamic route having a bounded error, the bounded error based on a dynamic constraint of the robot.

5. The control system as defined in claim 4, wherein the dynamic filter includes an array of low pass filters.

6. The control system as defined in claim 4, wherein the dynamic constraint is at least one of a maximum position error, a maximum velocity, a maximum acceleration, or a maximum jerk.

7. The control system as defined in claim 1, further including an occupied space identifier to determine occupied space within the environment based on the depth images.

8. The control system as defined in claim 7, further including a free space developer to construct the unoccupied space of the map based on the occupied space determined by the occupied space identifier, the free space developer to discretize the unoccupied space into voxels, the voxels having voxel nodes corresponding to the center points of the voxels, the voxel nodes representing candidate locations for the robot.

9. The control system as defined in claim 8, further including a graph generator to generate a graph of the unoccupied space, the graph including connections between neighboring ones of the voxel nodes.

10. The control system as defined in claim 9, further including a path generator to generate the path, the path along a plurality of the connections of the graph and through a first subset of the candidate locations, the first subset including a second subset of the candidate locations, the candidate locations of the second subset being located within the field of view associated with the reference location and including the first candidate location, the first candidate location being located closest to the target location from among the candidate locations of the second subset.

11. A non-transitory computer-readable storage medium comprising instructions that, when executed, cause one or more processors of a robot to:
    command a depth camera of the robot to capture depth images of an environment, the depth camera having a field of view;
    generate a map of the environment based on the depth images, the map including a representation of unoccupied space within the environment, the map further including a path extending through the unoccupied space from a reference location of the robot to a target location of the robot;

determine whether a value of a size attribute of the field of view associated with the reference location satisfies a size attribute threshold; and generate, in response to the value of the size attribute satisfying the size attribute threshold, a route to be followed by the robot within the environment, the route including a first candidate location located along the path of the map between the reference location and the target location, the first candidate location being within the field of view associated with the reference location.

12. The non-transitory computer-readable storage medium as defined in claim 11, wherein the instructions, when executed, cause the one or more processors to:

determine whether the target location is within the field of view associated with the reference location; and generate the route in response to the value of the size attribute satisfying the size attribute threshold and the target location not being within the field of view associated with the reference location.

13. The non-transitory computer-readable storage medium as defined in claim 11, wherein the instructions, when executed, cause the one or more processors to modify an orientation of the robot in response to the value of the size attribute not satisfying the size attribute threshold.

14. The non-transitory computer-readable storage medium as defined in claim 11, wherein the instructions, when executed, cause the one or more processors to convert the route into a dynamic route having a bounded error, the bounded error based on a dynamic constraint of the robot.

15. The non-transitory computer-readable storage medium as defined in claim 14, wherein the dynamic constraint is at least one of a maximum position error, a maximum velocity, a maximum acceleration, or a maximum jerk.

16. A method comprising:

commanding, by executing a computer-readable instruction with one or more processors of a robot, a depth camera of the robot to capture depth images of an environment, the depth camera having a field of view;

generating, by executing a computer-readable instruction with the one or more processors, a map of the environment based on the depth images, the map including a representation of unoccupied space within the environment, the map further including a path extending through the unoccupied space from a reference location of the robot to a target location of the robot;

determining, by executing a computer-readable instruction with the one or more processors, whether a value of a size attribute of the field of view associated with the reference location satisfies a size attribute threshold; and generating, by executing a computer-readable instruction with the one or more processors in response to the value of the size attribute satisfying the size attribute threshold, a route to be followed by the robot within the environment, the route including a first candidate location located along the path of the map between the reference location and the target location, the first candidate location being within the field of view associated with the reference location.

17. The method as defined in claim 16, further including:

determining, by executing a computer-readable instruction with the one or more processors, whether the target location is within the field of view associated with the reference location; and generating, by executing a computer-readable instruction with the one or more processors in response to the value of the size attribute satisfying the size attribute threshold and the target location not being within the field of view associated with the reference location, the route.

18. The method as defined in claim 16, further including modifying, by executing a computer-readable instruction with the one or more processors, an orientation of the robot in response to the value of the size attribute not satisfying the size attribute threshold.

19. The method as defined in claim 16, further including converting, by executing a computer-readable instruction with the one or more processors, the route into a dynamic route having a bounded error, the bounded error based on a dynamic constraint of the robot.

20. The method as defined in claim 19, wherein the dynamic constraint is at least one of a maximum position error, a maximum velocity, a maximum acceleration, or a maximum jerk.

21. A robot, the robot comprising:

a depth camera having a field of view;

computer-readable instructions; and processor circuitry to execute the computer-readable instructions to:

command the depth camera to capture depth images of an environment;

generate a map of the environment based on the depth images, the map including a representation of unoccupied space within the environment, the map further including a path extending through the unoccupied space from a reference location of the robot to a target location of the robot;

determine whether a value of a size attribute of the field of view associated with the reference location satisfies a size attribute threshold; and generate, in response to the value of the size attribute satisfying the size attribute threshold, a route to be followed by the robot within the environment, the route including a first candidate location located along the path of the map between the reference location and the target location, the first candidate location being within the field of view associated with the reference location.

22. The robot as defined in claim 21, wherein the processor circuitry is to:

determine whether the target location is within the field of view associated with the reference location; and generate the route in response to the value of the size attribute satisfying the size attribute threshold and the target location not being within the field of view associated with the reference location.

23. The robot as defined in claim 21, wherein the processor circuitry is to modify an orientation of the robot in response to the value of the size attribute not satisfying the size attribute threshold.

24. The robot as defined in claim 21, wherein the processor circuitry is to convert the route into a dynamic route having a bounded error, the bounded error based on a dynamic constraint of the robot.

* * * * *